US012625976B2

(12) United States Patent
Wang et al.

(10) Patent No.: US 12,625,976 B2
(45) Date of Patent: May 12, 2026

(54) DATA ANALYTICS SYSTEM AND ITS OPERATION

(71) Applicant: City University of Hong Kong, Kowloon (HK)

(72) Inventors: Cong Wang, Kowloon (HK); Chengjun Cai, Kowloon (HK); Yichen Zang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 324 days.

(21) Appl. No.: 18/449,143

(22) Filed: Aug. 14, 2023

(65) Prior Publication Data

US 2025/0061209 A1     Feb. 20, 2025

(51) Int. Cl.
G06F 21/60          (2013.01)
H04L 9/00           (2022.01)

(52) U.S. Cl.
CPC ............ G06F 21/602 (2013.01); H04L 9/008 (2013.01)

(58) Field of Classification Search
CPC ............................... G06F 21/602; H04L 9/008
See application file for complete search history.

(56) References Cited

U.S. PATENT DOCUMENTS

| | | | | |
|---|---|---|---|---|
| 8,819,335 B1* | 8/2014 | Salessi | ................ | G06F 12/0246 |
| | | | | 711/147 |
| 9,698,986 B1* | 7/2017 | Gutoski | ................ | H04L 9/3093 |
| 2010/0318812 A1 | 12/2010 | Auradkar et al. | | |
| 2012/0166818 A1* | 6/2012 | Orsini | ................... | H04L 9/3247 |
| | | | | 713/193 |
| 2015/0161398 A1 | 6/2015 | De Cristofaro et al. | | |
| 2017/0201498 A1 | 7/2017 | Baig et al. | | |
| 2018/0314741 A1* | 11/2018 | Tewari | ................ | H04L 51/046 |
| 2020/0084051 A1 | 3/2020 | Bessonov et al. | | |
| 2020/0311300 A1 | 10/2020 | Callcut et al. | | |
| 2021/0224404 A1 | 7/2021 | Shrinivasan et al. | | |
| 2022/0198059 A1 | 6/2022 | Hatcher et al. | | |
| 2022/0405420 A1 | 12/2022 | Tommasi et al. | | |
| 2025/0131115 A1* | 4/2025 | Wang | ..................... | H04L 9/085 |

OTHER PUBLICATIONS

Felix Schuster, Manuel Costa, Cédric Fournet, Christos Gkantsidis, Marcus Peinado, Gloria Mainar-Ruiz, and Mark Russinovich. 2015. VC3: Trustworthy data analytics in the cloud using SGX. In Proc. of IEEE S&P.

(Continued)

*Primary Examiner* — Ayoub Alata
(74) *Attorney, Agent, or Firm* — Renner, Kenner, Greive, Bobak, Taylor & Weber

(57)          ABSTRACT

A method for operating a data analytics system includes storing, at a first server system of the data analytics system, a first key associated with a data provider and/or storing, at a second server system of the data analytics system, a second key associated with the data provider. The first key and the second key are complementary keys generated using a secret sharing based cryptographic algorithm based on a policy arranged to control usage of data provided by the data provider. The first key and the second key are arranged to facilitate performing of a data analytics operation at the data analytics system.

24 Claims, 11 Drawing Sheets

1300

| | |
|---|---|
| 1302A — Store, at a first server system, a first key associated with a data provider | Store, at a second server system, a second key associated with the data provider — 1302B |
| 1304A — Receive/obtain, at the first server system, a first share of a data provided by the data provider | Receive/obtain, at the second server system, a second share of a data provided by the data provider — 1304B |
| 1306A — Encrypt, at the first server system, the first share of the data based on a secret key of the first server system using a symmetric homomorphic stream encryption (SHSE) based method, to obtain an encrypted first share of the data | Encrypt, at the second server system, the second share of the data based on a secret key of the second server system using the symmetric homomorphic stream encryption (SHSE) based method, to obtain an encrypted second share of the data — 1306B |

Determine encrypted data based on the encrypted first share of the data and the encrypted second share of the data — 1308

Store the encrypted data — 1310

(56) References Cited

OTHER PUBLICATIONS

Shayak Sen, Saikat Guha, Anupam Datta, Sriram K. Rajamani, Janice Y. Tsai, and Jeannette M. Wing. 2014. Bootstrapping Privacy Compliance in Big Data Systems. In Proc. of IEEE S&P.

Adi Shamir. 1979. How to share a secret. CACM 22, 11 (1979), 612-613.

Elaine Shi, TH Hubert Chan, Eleanor Rieffel, Richard Chow, and Dawn Song. 2011. Privacy-preserving aggregation of time-series data. In Proc. of NDSS.

Radu Sion. 2005. Query Execution Assurance for Outsourced Databases. In Proc. of ACM VLDB.

Markus Stadler. 1996. Publicly Verifiable Secret Sharing. In Proc. of EUROCRYPT.

Florian Tramèr, Fan Zhang, Huang Lin, Jean-Pierre Hubaux, Ari Juels, and Elaine Shi. 2017. Sealed-Glass Proofs: Using Transparent Enclaves to Prove and Sell Knowledge. In Proc. of IEEE Euro S&P.

U. S. Department of Health and Human Services Office for Civil Rights. 2021. Breach Portal: Notice to the Secretary of HHS Breach of Unsecured Protected Health Information. (2021). Online at: https://ocrportal.hhs.gov/ocr/breach/breach_report.jsf.

Frank Wang, Ronny Ko, and James Mickens. 2019. Riverbed: Enforcing User-defined Privacy Constraints in Distributed Web Services. In Proc. of USENIX NSDI.

Frank Wang, Catherine Yun, Shafi Goldwasser, Vinod Vaikuntanathan, and Matei Zaharia. 2017. Splinter: Practical Private Querieson Public Data. In Proc. of USENIX NSDI.

Gavin Wood. 2014. Ethereum: A secured ecentralised generalised transaction ledger. Ethereum Project Yellow Paper 151 (2014), 1-32.

Adil Ahmad, Kyungtae Kim, Muhammad Ihsanulhaq Sarfaraz, and Byoung young Lee. 2018. OBLIVIATE: A Data Oblivious Filesystem for Intel SGX. In Proc. of NDSS.

Le Trieu Phong, Yoshinori Aono, Takuya Hayashi, Lihua Wang, and Shiho Moriai. 2017. Privacy-preserving deep learning via additively homomorphic encryption. IEEE TIFS 13, 5(2017), 1333-1345.

Donald Beaver. 1991. Efficient Multiparty Protocols Using Circuit Randomization. In Proc. of CRYPTO.

Mihir Bellare, Shafi Goldwasser, Carsten Lund, and Alexander Russell. 1994. Efficient probabilistic checkable proofs and applications to approximation. In Proc. of ACM STOC.

Eli Ben-Sasson, Alessandro Chiesa, Daniel Genkin, Eran Tromer, and Madars Virza. 2013. SNARKs for C: Verifying Program Executions Succinctly and in Zero Knowledge. InProc. of CRYPTO.

Edo Roth, Hengchu Zhang, Andreas Haeberlen, and Benjamin C. Pierce. 2020. Orchard: Differentially Private Analytics at Scale. In Proc. of USENIX OSDI.

Edo Roth, Daniel Noble, Brett Hemenway Falk, and Andreas Haeberlen. 2019. Honeycrisp: large-scale differentially private aggregation without a trusted core. In Proc. of ACM SOSP.

Dan Boneh, Elette Boyle, Henry Corrigan-Gibbs, Niv Gilboa, and Yuval Ishai. 2021. Lightweight Techniques for Private Heavy Hitters. In Proc. of IEEE S&P.

Elette Boyle, Nishanth Chandran, Niv Gilboa, Divya Gupta, Yuval Ishai, Nishant Kumar, and Mayank Rathee. 2021. Function Secret Sharing for Mixed-Mode and Fixed-Point Secure Computation. In Proc. of EUROCRYPT.

Elette Boyle, Niv Gilboa, and Yuval Ishai. 2015. Function Secret Sharing. In Proc. of EUROCRYPT.

Elette Boyle, Niv Gilboa, and Yuval Ishai. 2016. Function Secret Sharing: Improvements and Extensions. In Proc. of ACMCCS.

Lukas Burkhalter, Anwar Hithnawi, Alexander Viand, Hossein Shafagh, and Sylvia Ratnasamy. 2020. Time Crypt: Encrypted Data Stream Processing at Scale with Cryptographic Access Control. InProc. Of USENIX NSDI.

Lukas Burkhalter, Nicolas Küchler, Alexander Viand, Hossein Shafagh, and Anwar Hithnawi. 2021. Zeph: Cryptographic Enforcement of End-to-End Data Privacy. In Proc. of OSDI.

Chengjun Cai, Yichen Zang, Cong Wang, Xiaohua Jia, and Qian Wang.2022. Vizard: A Metadata-hiding Data Analytic System with End-to-End Policy Controls. IACR Cryptology ePrint Archive (2022). Online at: https://eprint.iacr.org/2022/1115.

Chengjun Cai, Yifeng Zheng, Anxin Zhou, and Cong Wang. 2019. Building a Secure Knowledge Market placeover Crowdsensed Data Streams. IEEET DSC1, 1 (2019), 1-1.

Rui Chen, Qian Xiao, Yu Zhang, and Jianliang Xu. 2015. Differentially Private High-Dimensional Data Publication via Sampling-Based Inference. In Proc. of ACM SIGKDD.

Weikeng Chen and Raluca Ada Popa. 2020. Metal: A Metadata-Hiding File-Sharing System. In Proc. of NDSS.

Henry Corrigan-Gibbs and Dan Boneh. 2017. Prio: Private, Robust, and Scalable Computation of Aggregate Statistics. In Proc. of USENIX NSDI.

Henry Corrigan-Gibbs, Dan Boneh, and David Mazières. 2015. Riposte: An Anonymous Messaging System Handling Millions of Users. In Proc. of IEEE S&P.

Ivan Damgård, Daniel Escudero, Tore Kasper Frederiksen, Marcel Keller, Peter Scholl, and Nikolaj Volgushev. 2019. New Primitives for Actively-Secure MPC over Rings with Applications to Private Machine Learning. In Proc. of IEEE S&P.

Leode Castro and Antigoni Polychroniadou. 2021. Lightweight, Maliciously Secure Verifiable Function Secret Sharing. IACR Cryptol. ePrint Arch. (2021). https://eprint.iacr.org/2021/580.

Daniel Demmler, Peter Rindal, Mike Rosulek, and Ni Trieu. 2018. PIR-PSI: Scaling Private Contact Discovery. PoPETs 2018, 4 (2018), 159-178.

Roger Dingledine, Nick Mathewson, and Paul F. Syverson. 2004. Tor: The Second-Generation Onion Router. In Proc. of USENIX Security.

Jack Doerner and Abhi Shelat. 2017. Scaling ORAM for Secure Computation. In Proc. of ACMCCS.

Huayi Duan, Yifeng Zheng, Yuefeng Du, Anxin Zhou, Cong Wang, and Man Ho Au. 2019. Aggregating crowd wisdom via blockchain: A private, correct, and robust realization. In Proc. of IEEE PerCom.

Eslam Elnikety, Aastha Mehta, Anjo Vahldiek-Oberwagner, Deepak Garg, and Peter Druschel. 2016. Thoth: Comprehensive Policy Compliance in Data Retrieval Systems. In Proc. of USENIX Security.

Saba Eskandarian, Henry Corrigan-Gibbs, Matei Zaharia, and Dan Boneh. 2021. Express: Lowering the Cost of Metadata-hiding Communication with Crypto-graphic Privacy. In Proc. of USENIX Security.

Rishabh Poddar, Ganesh Ananthanarayanan, Srinath Setty, Stavros Volos, and Raluca Ada Popa. 2020. Visor: Privacy-Preserving Video Analytics as a Cloud Service. In Proc. of USENIX Security.

Bryan Parno, Jon Howell, Craig Gentry, and Mariana Raykova. 2013. Pinocchio: Nearly Practical Verifiable Computation. In Proc. of IEEE S&P.

Payman Mohassel and Yupeng Zhang. 2017. SecureML: A system for scalable privacy-preserving machine learning. In Proc. of IEEE S&P.

Yossi Gilad, Rotem Hemo, Silvio Micali, Georgios Vlachos, and Nickolai Zeldovich. 2017. Algorand: Scaling Byzantine Agreements for Cryptocurrencies. In Proc. of SOSP.

Oded Goldreich and Rafail Ostrovsky. 1996. Software protection and simulation on oblivious RAMs. Journal of the ACM (JACM) 43, 3 (1996), 431-473.

Philippe Golle and Ilya Mironov. 2001. Uncheatable Distributed Computations. In Proc. of CT-RSA.

Trinabh Gupta, Natacha Crooks, Whitney Mulhern, Srinath T. V. Setty, Lorenzo Alvisi, and Michael Walfish. 2016. Scalable and Private Media Consumption with Popcorn. In Proc. of USENIX NSDI.

Michael Hill and Dan Swinhoe. 2021. The 15 biggest data breaches of the 21st century. (2021). Online at: https://www.csoonline.com/article/2130877/the-biggest-data-breaches-of-the-21st-century.html.

Yuncong Hu, Sam Kumar, and Raluca Ada Popa. 2020. Ghostor: Toward a Secure Data-Sharing System from Decentralized Trust. In Proc. of USENIX NSDI.

Pew Research Center. 2019. Americans and Privacy: Concerned, Confused and Feeling Lack of Control Over Their Personal Information. (2019). Online at: https://www.pewresearch.org/internet/

(56) References Cited

OTHER PUBLICATIONS

2019/11/15/americans-and-privacy-concerned-confused-and-feeling-lack-of-control-over-their-personal-information/.

Pratyush Mishra, Ryan Lehmkuhl, Akshayaram Srinivasan, Wenting Zheng, and Raluca Ada Popa. 2020. Delphi: A Cryptographic Inference Service for Neural Networks. In Proc. of USENIX Security.

Eleftherios Kokoris-Kogias, Philipp Jovanovic, Linus Gasser, Nicolas Gailly, Ewa Syta, and Bryan Ford. 2018. OmniLedger: A Secure, Scale-Out, Decentralized Ledger via Sharding. In Proc. of IEEE S&P.

Steve Lu and Rafail Ostrovsky. 2013. Distributed Oblivious RAM for Secure Two-Party Computation. In Proc. of TCC.

Matteo Maffei, Giulio Malavolta, Manuel Reinert, and Dominique Schröder. 2015. Privacy and Access Control for Outsourced Personal Records. In Proc. of IEEE S&P.

Matteo Maffei, Giulio Malavolta, Manuel Reinert, and Dominique Schröder. 2017. Maliciously Secure Multi-Client ORAM. In Proc. of ACNS.

Miti Mazmudar and Ian Goldberg. 2020. Mitigator: Privacy policy compliance using trusted hardware. PoPETs 2020, 3 (2020), 204-221.

Dauterman, Emma, et al. "Waldo: A private time-series database from function secret sharing." 2022 IEEE Symposium on Security and Privacy (SP). IEEE, 2022.

Shoshana Zuboff. 2019. The Age of Surveillance Capitalism. Profile Books (2019).

Wenting Zheng, Ryan Deng, Weikeng Chen, Raluca Ada Popa, Aurojit Panda, and Ion Stoica. 2021. Cerebro: A Platform for Multi-Party Cryptographic Collaborative Learning. In Proc. of USENIX Security.

Wenting Zheng, Anku rDave, Jethro G. Beekman, Raluca Ada Popa, Joseph E. Gonzalez, and Ion Stoica. 2017. Opaque: An Oblivious and Encrypted Distributed Analytics Platform. In Proc. of USENIX Symposiumon Networked Systems Design and Implementation, NSDI.

Xiaojian Zhang, Rui Chen, Jianliang Xu, Xiaofeng Meng, and Yingtao Xie. 2014. Towards Accurate Histogram Publication under Differential Privacy. In Proc. of SIAM International Conference on Data Mining.

Mahdi Zamani, Mahnush Movahedi, and Mariana Raykova. 2018. Rapid Chain: Scaling Blockchain via Full Sharding. In Proc. of ACMCCS.

Min Xu, Antonis Papadimitriou, Ariel Feldman, and Andreas Haeberlen. 2018. Using Differential Privacy to Efficiently Mitigate Side Channels in Distributed Analytics. In Proc. of the 11th European Workshop on Systems Security, (EuroSec).

* cited by examiner

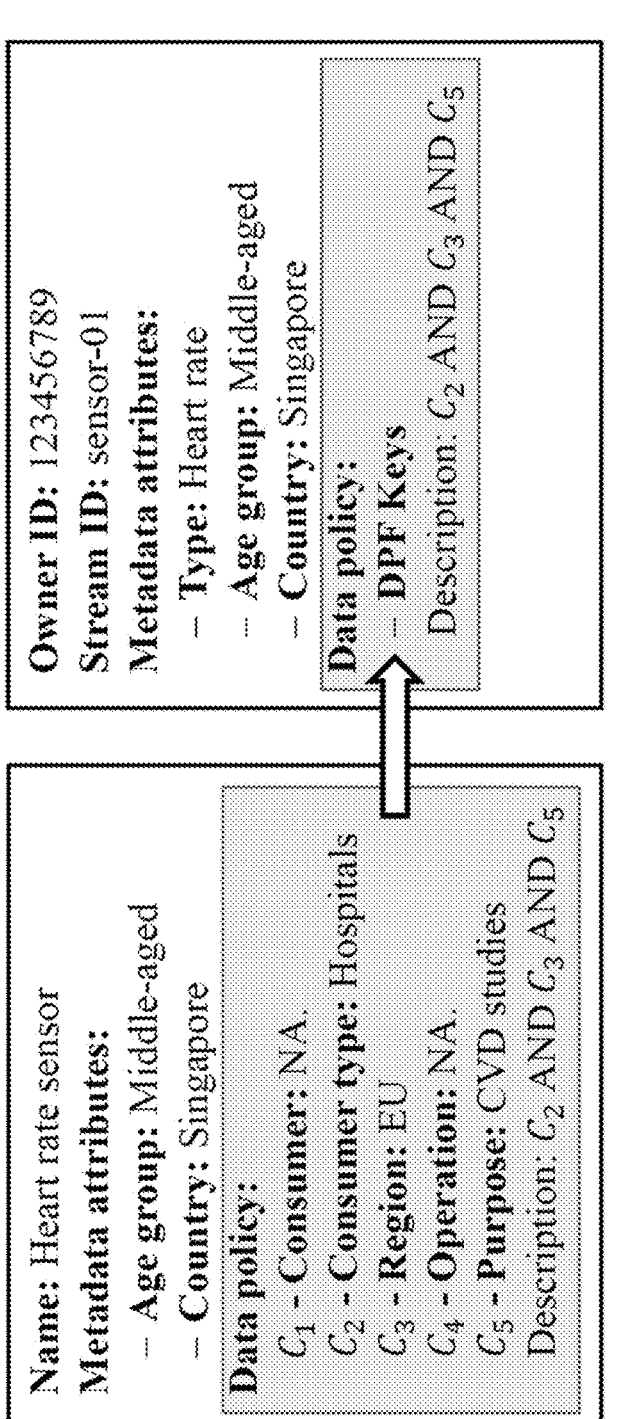

Name: Heart rate sensor
Metadata attributes:
  – Age group: Middle-aged
  – Country: Singapore
Data policy:
  $C_1$ – Consumer: NA.
  $C_2$ – Consumer type: Hospitals
  $C_3$ – Region: EU
  $C_4$ – Operation: NA.
  $C_5$ – Purpose: CVD studies
  Description: $C_2$ AND $C_3$ AND $C_5$

Owner ID: 123456789
Stream ID: sensor-01
Metadata attributes:
  – Type: Heart rate
  – Age group: Middle-aged
  – Country: Singapore
Data policy:
  – DPF Keys
  Description: $C_2$ AND $C_3$ AND $C_5$

Figure 4

Consumer ID: 1456164
Data requirements: [Health care data; Middle-aged; Southeast Asia]
Time window: From [2020-8-28] to [2021-10-12]
Description: [1456164; Hospitals; EU; Summation; CVD studies]

Figure 5

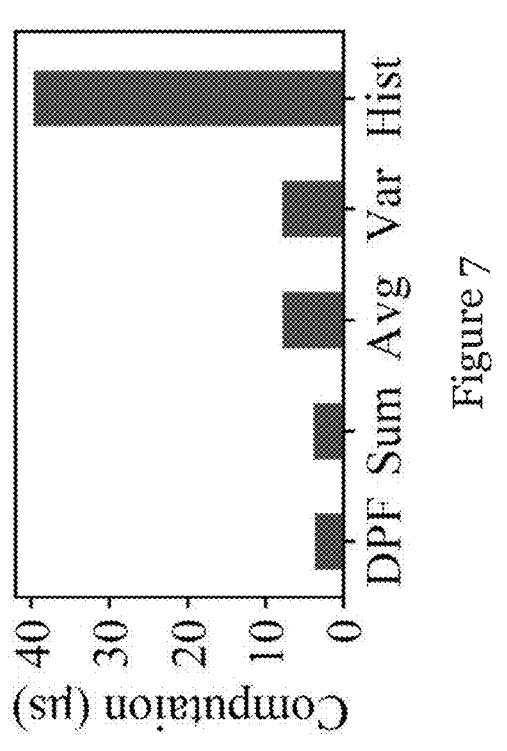
Figure 7
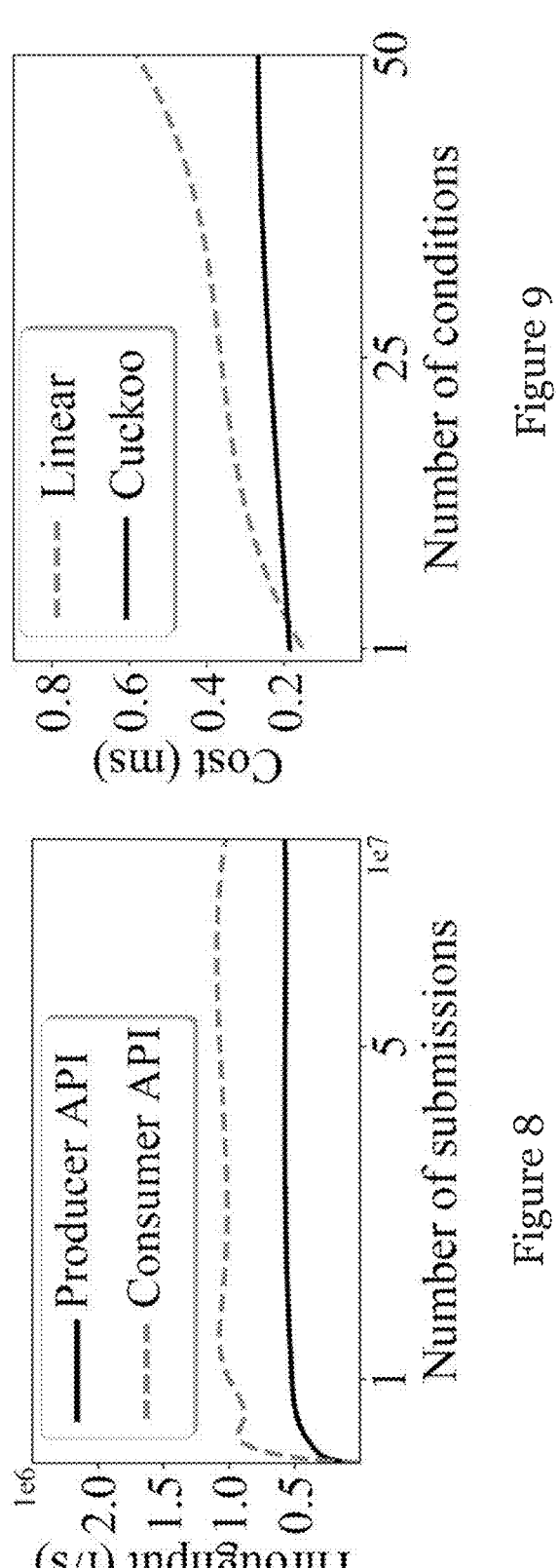
Figure 9
Figure 8

DATA ANALYTICS SYSTEM AND ITS OPERATION

TECHNICAL FIELD

The invention relates to a data analytics system and its operation.

BACKGROUND

In today's society, healthcare, business decisions, and government operations all rely heavily on the availability of data and advanced analytic tools for accurate decision-making. However, in practice, data is often fragmented and stored locally by individuals, and concerns related to data leakage and unauthorized data sharing have made it difficult to motivate individuals to share their data. Traditionally, once the data is shared by the data owners, it goes out of the hands of the data owners, i.e., it can then be copied, traded, or abused in uncontrollable manners. According to some recent research, many individuals have concerns about how companies and governments use their data and/or feel that they have little or no control over how their data is used.

To remedy the above problem, some existing techniques construct privacy frameworks that allow owners to define their privacy preferences and regulate data usage. However, most of these techniques require deployment of trusted hardware to enforce the policies of data owners. For real-world data processing systems that do not apply trusted hardware (e.g., Apache Kafka), they would still operate in a notice and consent mode and rely on centralized trusted authorities for policy enforcement. Problematically, however, data breach and misuse incidents due to abuse by such trusted authorities exist.

Apart from the lack of privacy-preserving and enforceable data analytic tools that do not rely on centralized trust, the data policies may be susceptible to attack and may help an attacker infer the sensitive data of the data owners. As an example, consider a data owner, Alice, who decides to authorize her data to an analytic task q. While Alice can encrypt her data for confidentiality protections, based on a side information that q is initiated by a psychiatrist (e.g., by looking up information about q on the Internet), an attacker can readily learn that Alice's data will be used by a psychiatrist and thus Alice might be suffering from mental illness. One approach to hide such policy-related metadata is to encrypt the data policies and later adopt secure computation techniques on the server side (e.g., outsourced multiparty computation) to privately decrypt and use the data policy. However, this approach can only preserve the confidentiality of the underlying computation process. A curious server can still determine whether data of an owner has been used for a given task (by observing other metadata like data access patterns) and infer the same sensitive information about the data owner.

The above metadata leakage problem is related to some existing security techniques that strive to preserve oblivious data access, i.e., to hide which data have been accessed or used for a query execution. For example, oblivious RAM (ORAM) can be attached with secure computation techniques to fulfill the privacy goals for both the data and its metadata. However, most existing ORAM constructions focus only on a single owner setting or would rely on trusting a proxy to maintain the encrypted RAM storage. On the other hand, ORAM constructions that can support multiowner settings would generally incur heavy computation costs, making them difficult to adopt or deploy in practice.

SUMMARY OF THE INVENTION

In a first aspect, there is provided a method for operating a data analytics system. The method includes: storing, at a first server system of the data analytics system, a first key associated with a data provider, and/or storing, at a second server system of the data analytics system, a second key associated with the data provider. The first key and the second key are complementary keys generated using a secret sharing based cryptographic algorithm based on a policy arranged to control usage of data provided by the data provider. The first key and the second key are arranged to facilitate performing of a data analytics operation at the data analytics system. For example, the data provider may be a data owner. For example, the generation of the first key and the second key may be performed at a data provider device (e.g., a computing device of any form).

In some embodiments of the first aspect, the secret sharing based cryptographic algorithm comprises a distributed point function based cryptographic algorithm.

In some embodiments of the first aspect, the data analytics operation is based on the secret sharing based cryptographic algorithm.

In some embodiments of the first aspect, the data analytics operation is arranged to: analyze data provided by data providers including the data provider based on a data analytics query, and determine a data output of data provided by one or more data providers that match the data analytics query.

In some embodiments of the first aspect, the policy comprises a single condition. In some embodiments of the first aspect, the policy comprises a plurality of conditions. For example, at least two of the plurality of conditions may be associated with an AND operator. For example, at least two of the plurality of conditions may be associated with a NOT operator. For example, at least two of the plurality of conditions may be associated with an OR operator.

In some embodiments of the first aspect, the plurality of conditions includes at least one (e.g., one, two, three, or all) of the following conditions: a condition associated with data consumer or type of data consumer that can or cannot access the data provided by the data provider, a condition associated with a location requirement for data consumer or type of data consumer that can or cannot access the data provided by the data provider, a condition associated with usage control of the data provided by the data provider, and a condition associated with operation that can or cannot be performed using the data provided by the data provider.

In some embodiments of the first aspect, the method further comprises: receiving or obtaining, at the first server system, a first share of a data provided by the data provider; receiving or obtaining, at the second server system, a second share of the data provided by the data provider; encrypting, at the first server system, the first share of the data based on a secret key of the first server system using a symmetric homomorphic stream encryption (SHSE) based method, to obtain an encrypted first share of the data; encrypting, at the second server system, the second share of the data based on a secret key of the second server system using the symmetric homomorphic stream encryption (SHSE) based method, to obtain an encrypted second share of the data, the secret key of the second server system being different from the secret key of the first server system; and determining, at one or both of the first server system and the second server system, an encrypted data based on the encrypted first share of the data and the encrypted second share of the data.

In some embodiments of the first aspect, the determining of the encrypted data comprises: determining, at the first server system, the encrypted data based on the encrypted first share of the data and the encrypted second share of the data, and determining, at the second server system, the encrypted data based on the encrypted first share of the data and the encrypted second share of the data.

In some embodiments of the first aspect, the method further comprises: storing the encrypted data at each of the first server system and the second server system. In other words, identical copies of the encrypted data are stored at each of the first server system and the second server system.

In some embodiments of the first aspect, the encrypted first share of the data is in the form of a ciphertext share, the encrypted second share of the data is in the form of a ciphertext share; and the encrypted data is in the form of a ciphertext formed based on the ciphertext share of the encrypted first share of the data and the ciphertext share of the encrypted second share of the data.

In some embodiments of the first aspect, the data consists only of the first share of the data and the second share of the data. In some embodiments of the first aspect, the first share of the data and the second share of the data are split from the data. In some examples, the splitting may be performed at the data provider device. In some examples, the splitting may be performed at the data analytics system.

In some embodiments of the first aspect, the first share of the data and the second share of the data are split randomly from the data.

In some embodiments of the first aspect, the first share of the data and the second share of the data are split from the data based on an additive secret sharing based method.

In some embodiments of the first aspect, the secret key of the first server system is a pseudo-random function key generated based on a pseudo-random function. In some embodiments of the first aspect, the secret key of the second server system is a pseudo-random function key generated based on a pseudo-random function.

In some embodiments of the first aspect, the data includes a data value.

In some embodiments of the first aspect, the data includes the data value and one or more values arithmetically associated with the data value. This may facilitate a more versatile data analytics operation.

In some embodiments of the first aspect, the data includes a vector of bits.

In some embodiments of the first aspect, the data provided by the data provider is part of a data stream that is provided by the data provider. The data stream includes, at least, a first data corresponding to a first epoch and a second data corresponding to a second epoch. The first data is the data mentioned above.

In some embodiments of the first aspect, the method further comprises: receiving or obtaining, at the first server system, a first share of the second data provided by the data provider; receiving or obtaining, at the second server system, a second share of the second data provided by the data provider; encrypting, at the first server system, the first share of the second data based on the secret key of the first server system using the symmetric homomorphic stream encryption (SHSE) based method, to obtain an encrypted first share of the second data; encrypting, at the second server system, the second share of the second data based on the secret key of the second server system using the symmetric homomorphic stream encryption (SHSE) based method, to obtain an encrypted second share of the second data; and determining, at one or both of the first server system and the second server system, an encrypted second data based on the encrypted first share of the second data and the encrypted second share of the second data.

The method can be repeated for other data in the data stream, if the data stream includes more than two data.

In some embodiments of the first aspect, the determining of the encrypted second data comprises: determining, at the first server system, the encrypted second data based on the encrypted first share of the second data and the encrypted second share of the second data, and determining, at the second server system, the encrypted second data based on the encrypted first share of the second data and the encrypted second share of the second data.

In some embodiments of the first aspect, the method further comprises: storing the encrypted second data at each of the first server system and the second server system. In other words, identical copies of the encrypted second data are stored at each of the first server system and the second server system.

In some embodiments of the first aspect, the encrypted first share of the second data is in the form of a ciphertext share, the encrypted second share of the second data is in the form of a ciphertext share, and the encrypted second data is in the form of a ciphertext formed based on the ciphertext share of the encrypted first share of the second data and the ciphertext share of the encrypted second share of the second data.

In some embodiments of the first aspect, the first server system is arranged in a first cloud network, and the second server system is arranged in a second cloud network separate from the first cloud network.

In some embodiments of the first aspect, the first key and the second key are complementary keys generated using the secret sharing based cryptographic algorithm based on: the policy arranged to control usage of data provided by the data provider.

In some embodiments of the first aspect, the method can be performed for one or more other data providers.

In a second aspect, there is provided a method for operating a data analytics system, comprising: receiving a data analytics query; based on the data analytics query, analyzing data provided by data providers stored in the data analytics system; and determining a data output of data provided by one or more data providers that match the data analytics query. For example, the data providers may be data owners.

In some embodiments of the second aspect, analyzing data provided by data providers comprises: evaluating, based on a plurality of pairs of first and second keys, each pair associated with a respective data provider, whether data provided by one or more of the data providers match the data analytics query; and in response to determining a match, aggregating the data provided by the one or more of the data providers that match the data analytics query. The data output corresponds to the aggregated data.

In some embodiments of the second aspect, each pair of the plurality of pairs of first and second keys is respectively generated using a secret sharing based cryptographic algorithm based on a policy arranged to control usage of data provided by the respective data provider.

In some embodiments of the second aspect, the secret sharing based cryptographic algorithm comprises a distributed point function based cryptographic algorithm.

In some embodiments of the second aspect, aggregating the data provided by the one or more of the data providers that match the data analytics query comprises: determining, at a first server of the data analytics system, a first encrypted aggregated data share; determining, at a second server of the data analytics system, a second encrypted aggregated data share; determining, at the first server, a first decryption key for decrypting the first encrypted aggregated data share; determining, at the second server, a second decryption key for decrypting the second encrypted aggregated data share; determining, at the first server, a first aggregated data share by decrypting the first encrypted aggregated data share using the first decryption key; and determining, at the first server, a second aggregated data share by decrypting the second encrypted aggregated data share using the second decryption key. The data output corresponds to the first aggregated data share and the second aggregated data share.

In some embodiments of the second aspect, the method further comprises: processing the data output based on a result release operation; and determining a data analytics query result based on the data output and the result release operation.

In some embodiments of the second aspect, the result release operation is arranged to enforce an integrity-based release policy, a privacy-based release policy, or a payment-based release policy.

In some embodiments of the second aspect, the data analytics system is the data analytics system in the first aspect.

In a third aspect, there is provided a method comprising the method of the first aspect and the method of the second aspect, implemented on the same data analytics system.

In a fourth aspect, there is provided a data analytics system comprising a first server system and a second server system. The first server system and the second server system are arranged to perform the method of the first aspect.

In a fifth aspect, there is provided a data analytics system comprising a first server system and a second server system. The first server system and the second server system are arranged to perform the method of the second aspect.

In a sixth aspect, there is provided a data analytics system comprising a first server system and a second server system. The first server system and the second server system are arranged to perform the method of the third aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Some embodiments of the invention will now be described, by way of example, with reference to the accompanying drawings in which:

FIG. 4 is an example illustration of data stream descriptions for a heart rate sensor in one example and a secure transformation for its data policies in one embodiment of the invention;

FIG. 5 is an example analytic query in one embodiment of the invention;

FIG. 7 is a graph showing computation cost for generating DPF keys and shares for different stream encodings: sum, average, variance, and histogram (with ten buckets) in one example;

FIG. 8 is a graph showing Kafka throughput for data stream submissions in one example;

FIG. 9 is a graph showing the DPF key evaluation cost for OR operators in one example;

DETAILED DESCRIPTION

Figure 13:
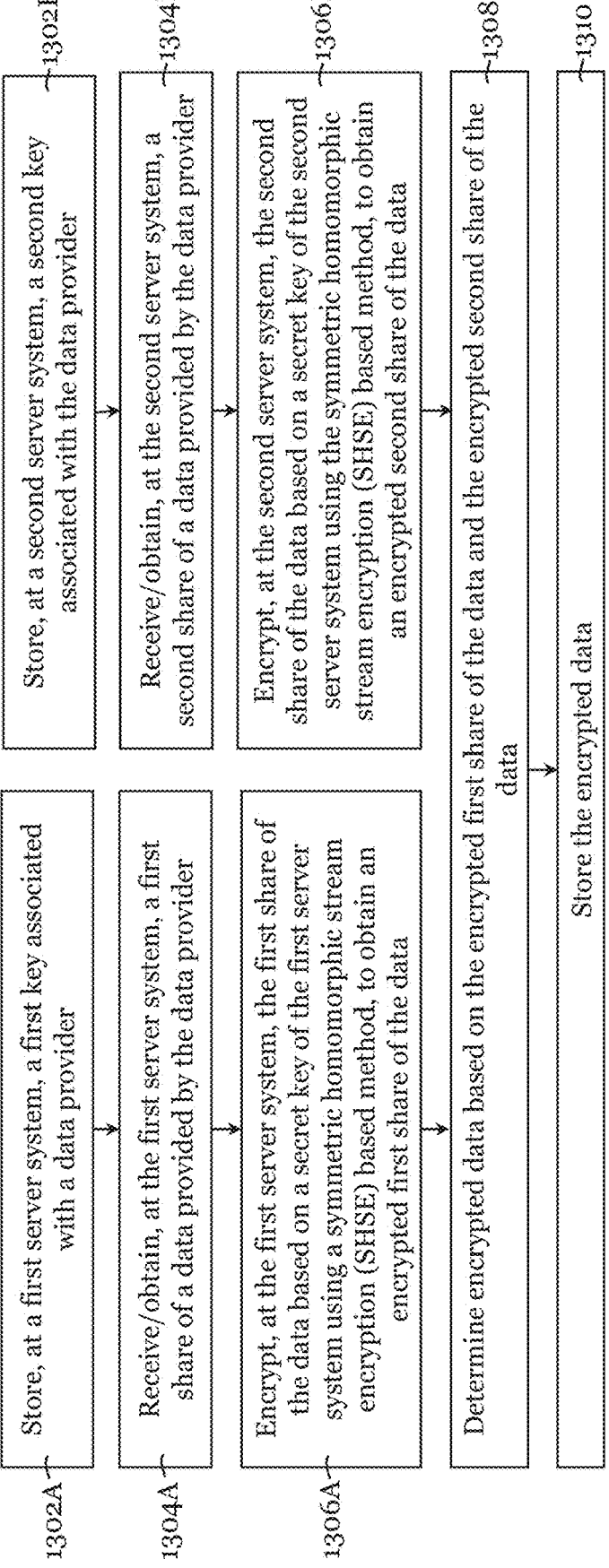
FIG. 13 is a flowchart illustrating a method for operating a data analytics system in some embodiments of the invention.

FIG. 13 shows a method 1300 for operating a data analytics system in some embodiments of the invention. In these embodiments, the data analytics system includes a first server system and a second server systems, each formed by one or more computing devices. In some embodiments, the first and second server systems may be arranged in separate or different cloud networks.

The method 1300 includes, in step 1302A, storing, at the first server system, a first key associated with a data provider, and in step 1302B, or storing, at the second server system, a second key associated with the data provider. The data provider may be the data owner or may have otherwise obtained the data directly or indirectly from a data owner. The first and second keys are complementary keys generated using a secret sharing based cryptographic algorithm and based on a policy arranged to control usage of data provided by the data provider. The secret sharing based cryptographic algorithm may include a distributed point function based cryptographic algorithm. The first and second keys are arranged to facilitate performing of a data analytics operation at the data analytics system. For example, the data analytics operation may be based on the secret sharing based cryptographic algorithm. For example, the data analytics operation may include: analyzing data provided by data providers including the data provider based on a data analytics query, and determining a data output of data provided by one or more data providers that match the data analytics query. The policy arranged to control usage of data provided by the data provider may include one or more conditions. In some examples, the conditions may include at least two of the plurality of conditions may be associated with an AND operator, a NOT operator, or an OR operator. In some examples, the one or more conditions may include: a condition associated with data consumer or type of data consumer that can or cannot access the data provided by the data provider, a condition associated with a location requirement for data consumer or type of data consumer that can or cannot access the data provided by the data provider, a condition associated with usage control of the data provided by the data provider, and/or a condition associated with operation that can or cannot be performed using the data provided by the data provider.

The method 1300 also includes, in step 1304A, receiving or obtaining, at the first server system, a first share of a data provided by the data provider, and in step 1304B, receiving or obtaining, at the second server system, a second share of the data provided by the data provider. In some embodiments, the data may consist only of the first share of the data and the second share of the data. In some embodiments, the first and second shares of the data are split from the data, e.g., at a data provider device or at the data analytics system. The splitting may be performed randomly. In some embodiments, the first and second shares of the data are split from the data based on an additive secret sharing based method. In some embodiments, the data includes a data value. In some embodiments, the data includes the data value and one or more values arithmetically associated with the data value. In some embodiments, the data includes a vector of bits.

The method 1300 also includes, in step 1306A, encrypting, at the first server system, the first share of the data based on a secret key of the first server system using a symmetric homomorphic stream encryption (SHSE) based method, to obtain an encrypted first share of the data, and in step 1306B, encrypting, at the second server system, the second share of the data based on a secret key of the second server system using the symmetric homomorphic stream encryption (SHSE) based method, to obtain an encrypted second share of the data. The secret keys of the two server systems can be different. In some embodiments, the secret key of the first server system is a pseudo-random function key generated based on a pseudo-random function and/or the secret key of the second server system is a pseudo-random function key generated based on a pseudo-random function. In some embodiments, the encrypted first share of the data may be in the form of a ciphertext share. In some embodiments, the encrypted second share of the data is in the form of a ciphertext share.

The method 1300 also includes, in step 1308, determining an encrypted data based on the encrypted first share of the data and the encrypted second share of the data. The determining in step 1308 may be performed at one or both of the first and second server systems. In some embodiments, the determining in step 1308 may be performed at only one of the first and second server systems and the encrypted data are shared to the other one of the first and second server systems. In some embodiments, the determining in step 1308 may be performed separately at both (each of) the first and second server systems. In some embodiments, the encrypted data may be in the form of a ciphertext formed based on the ciphertext share of the encrypted first share of the data and the ciphertext share of the encrypted second share of the data.

The method 1300 also includes, in step 1310, storing the encrypted data. The storing in step 1310 may include storing the encrypted data at each of the first and second server systems.

In method 1300, the data provided by the data provider is part of a data stream provided by the data provider. That data stream may include multiple data each corresponding to a respective epoch. Each data of the data stream may be processed using method 1300. The method 1300 can also be used to process data or data stream from one or more other data providers (each having respective first and second keys and policy).

Figure 14:
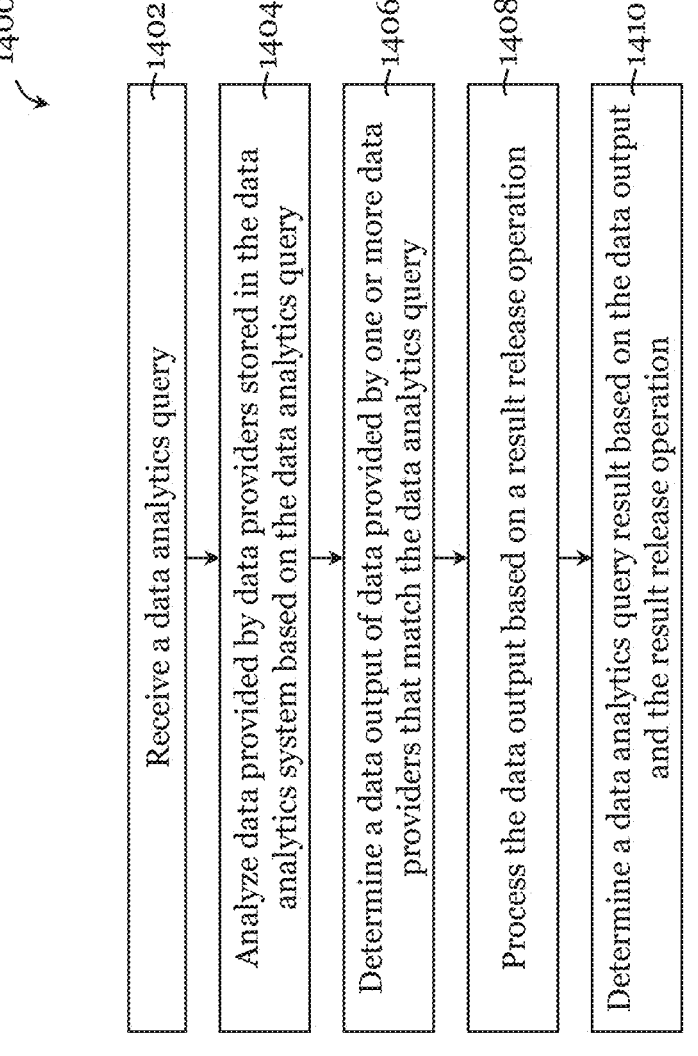
FIG. 14 is a flowchart illustrating a method for operating a data analytics system in some embodiments of the invention.

FIG. 14 shows a method 1400 for operating a data analytics system in some embodiments of the invention. In these embodiments, the data analytics system includes a first server system and a second server systems, each formed by one or more computing devices. In some embodiments, the first and second server systems may be arranged in separate or different cloud networks. In some embodiments, the data analytics system may be that used in the method 1300.

The method 1400 includes, in step 1402, receiving a data analytics query. The query may include a query string.

The method 1400 includes, in step 1404, based on the data analytics query, analyzing data provided by data providers stored in the data analytics system. The data providers may be the data owners or may have otherwise obtained the data directly or indirectly from the data owners. In some embodiments, the analyzing may include: evaluating, based on multiple pairs of first and second keys, each pair associated with a respective data provider, whether data provided by one or more of the data providers match the data analytics query, and in response to determining a match, aggregating the data provided by the one or more of the data providers that match the data analytics query. The data output corresponds to the aggregated data. In some embodiments, each pair of the pairs of first and second keys is respectively generated using a secret sharing based cryptographic algorithm (e.g., distributed point function based cryptographic algorithm) based on a policy arranged to control usage of data provided by the respective data provider. In some embodiments, aggregating the data provided by the one or more of the data providers that match the data analytics query includes: determining, at a first server of the data analytics system, a first encrypted aggregated data share; determining, at a second server of the data analytics system, a second encrypted aggregated data share; determining, at the first server, a first decryption key for decrypting the first encrypted aggregated data share; determining, at the second server, a second decryption key for decrypting the second encrypted aggregated data share; determining, at the first server, a first aggregated data share by decrypting the first encrypted aggregated data share using the first decryption key; and determining, at the first server, a second aggregated data share by decrypting the second encrypted aggregated data share using the second decryption key. The data output corresponds to the first aggregated data share and the second aggregated data share.

The method 1400 includes, in step 1406, determining a data output of data provided by one or more data providers that match the data analytics query.

The method 1400 includes, in step 1408, processing the data output based on a result release operation. In some embodiments, the result release operation is arranged to enforce an integrity-based release policy, a privacy-based release policy, or a payment-based release policy.

The method 1400 includes, in step 1410, determining a data analytics query result based on the data output and the result release operation.

The following disclosure provides some more-specific implementations of the methods 1300, 1400.

1—Overview of the Vizard Embodiment

In one embodiment of the invention, there is provided an efficient and metadata-hiding data analytic system called "Vizard", which provides full-fledged privacy preservation and enforceable control to data owners. The Vizard embodiment makes customized use of a suite of lightweight cryptographic techniques to meet the above goals, and proposes new designs to further accommodate the needs of practical data stream processing systems. According to evaluations, the metadata-hiding feature in Vizard only brings around 1.12× to 1.26× overhead compared to Zeph (e.g., disclosed in Burkhalter et al., Zeph: Cryptographic Enforcement of End-to-End Data Privacy (2021)), which is an existing privacy-enforced and real-time data stream analytic system without metadata protections. Overall, the Vizard embodiment takes around 4.6 s to securely handle a policy-controlled analytic query over 10 k data owners, each with a time-window of 100 data stream ciphertexts. As will be further illustrated below, the Vizard embodiment can be integrated with Apache Kafka (as disclosed in Apache Kafka (2021): https://kafka.apache.org/) to boost the ability in handling large-scale stream submissions.

The basic architecture of the Vizard embodiment is as follows. The Vizard embodiment considers a setting where each owner communicates with two non-colluding servers to outsource their data submissions and execute the analytic tasks. The confidentiality of the data and policies of the data owners can be protected as long as an attacker can compromise at most one server. To further fulfill end-to-end controls, the Vizard embodiment enables release policies for the query results given by the two servers and enforces them through a decentralized byzantine-secure committee. Data consumers can contact the committee for result retrievals and obtain the policy-enforced results.

In some implementations, the Vizard embodiment only hides metadata leakage during the query execution phase and not the data stream submission phase. Thus, in some implementations, all data owners may need to upload their data streams at a fixed frequency to avoid other timing-related pattern leakages. In some implementations, the Vizard embodiment includes targeted data stream setting with synchronized epochs, and each server will order data submissions by the data owners based on the epoch number.

1.1 Overview of Techniques Associated with the Vizard Embodiment

The technical ideas behind the constructions of the Vizard embodiment is now presented.

One observation is that the targeted problem relates to a simpler but independent problem that studies how to compute private subset histogram. In this problem, each owner i holds a string x and the servers hold a small set Q of strings. The technique for computing private subset histogram reveals, for each string $\sigma \in Q$, how many owners hold $\sigma$ without leaking each owner's secret string. This problem can be solved in an efficient and metadata-hiding way using a cryptographic tool called distributed point function (DPF), which is basically a secret-shared and compressed point function that has only one non-zero output (e.g., the output equals 1 for computing subset histogram).

Intuitively, by setting the non-zero output in a pair of DPF keys as each owner's data and utilizing the string x for recording each owner's policy descriptions (e.g., which query task can use his data), policy-controlled and metadata-hiding analytics can be achieved from the DPF-based private subset histogram process above. To aggregate all policy-matched owners' data, the servers can use the associated description string of an incoming query (e.g., its task name) as input to evaluate all owners' DPF keys and aggregate the outputs. This basic construction, while feasible, may not be ideal for practical use in some cases. In particular, one or more of the challenging problems below need to be addressed.

One challenge relates to stream support with DPF. Specifically, existing DPF schemes only allow each owner to embed one specific output in a pair of DPF keys. Therefore, the basic construction above would incur continuous (and burdening) DPF key construction costs on the owner side if it is directly applied to handle data streams. This challenge can be addressed as follows. Based on the observation that the data policy specified by each owner mat remain unchanged for a relatively long time (unlike the data values which may change at every epoch), i.e., most parts of the DPF key generation process (except the embedded data) are somewhat redundant, the Vizard embodiment decouples data values from the DPF keys. And as the data values are stored outside of the DPF keys, the two servers can self-aggregate the requested data values in advance (e.g., for a time-window covering several epochs), so that only a single data value will be used as input for each owner in subsequent analytics. The Vizard embodiment stores a single pair of DPF keys for each owner (as long as an owner's data policy remains unchanged) and only uses them to secretly embed controlling values of 0 or 1 when going through all owners' data values. Ideally, assuming there are U owners, and the data value and controlling value of owner i are $$d_i^*$$

and $T_i$ respectively, the computation required is thus $$\sum_i^U d_i^* \cdot T_i.$$

This resulting value is the summation of data values of all policy-matched owners, since $T_i=1$ only if the query matches policy of owner i. As data confidentiality should also be protected, the Vizard embodiment crafts a new two-server homomorphic stream encryption scheme (explained below) to encrypt the data values with a secret key that is jointly generated by the two servers (but is not known to either server). The encryption scheme outputs encrypted (but additive) database copies on the two servers, and the above technique can be applied to efficiently conduct secure policy-controlled analytics over data streams.

Another challenge relates to rich data policy supports. In some applications, supporting a simple policy condition, i.e., x=σ, is not enough. This is because in practice owners may want to construct more fine-grained policies by combining multiple conditions with various operators like AND, OR, and NOT. For example, an owner might want to authorize his data to consumers that are 1) type=hospitals AND 2) region=EU. To address this challenge, the Vizard embodiment enables support for all the three operators (AND, OR, and NOT). To this end, the Vizard embodiment starts by following a DPF-based query framework as disclosed in Wang et al., Splinter: Practical Private Queries on Public Data (2017) (which supports secure AND and OR queries over plaintext database) to modify the policy constructions of each owner, so that the controlling value (i.e., 1 or 0) can properly reflect the policy logic defined by the underlying operators. Vizard improves upon the design in Wang et al., Splinter: Practical Private Queries on Public Data (2017) and reduces the computation costs when evaluating policies defined with AND and OR operators (via the use of hash digests and cuckoo hashing, as explained below. The optimized designs in the Vizard embodiment ensure that the two servers can just evaluate a constant amount of DPF keys even when the number of policy conditions scales. In addition, The Vizard embodiment may further support NOT operator for owners to conveniently rule out infamous or unwanted consumers, which can be done by securely inverting the controlling values with secret shares of the value 1.

Another challenge relates to end-to-end controls. Specifically, in addition to enabling owners defining data policies that privately regulate how the data should be used, providing meaningful controls on how the analytic results should be released is also desirable for enhancing owner protection. The challenge, however, is to enforce the result release control process without centralized trust. To address this challenge, the Vizard embodiment provides three types of release policies to owners (for choosing). The first type is integrity-based release policy that attests policy enforcement and result integrity via correctness proofs given by the servers. The second type is privacy-based release policy that adds an appropriate amount of noises to the result for differential privacy (DP). The third type is payment-based release policy that enforces monetary rewards for the owners before releasing the results. To avoid allocating trust in a centralized third party, the Vizard embodiment relies on a decentralized committee (with honest majority) to jointly enforce the policies above. Each trustee in the committee will execute policy-specific and byzantine-secure operations to independently conduct result release controls, and data consumers will obtain the results only if the majority of trustees approve their requests.

1.2 Example Contributions of the Vizard Embodiment

The Vizard embodiment provides various contributions. For example, the Vizard embodiment provides a metadata-hiding and policy-controlled analytic system in a two-server setting. For example, the Vizard embodiment provides optimized extension methods to support rich data policies (i.e., with AND, OR, and NOT operators). For example, the Vizard embodiment provides decentralized result release control and lightweight constructions for integrity, privacy, and payment related release policies. For example, the Vizard embodiment can be implemented with or interfaced with Apache Kafka.

2—Problem Statement Associated with the Vizard Embodiment

This section describes the system model, threat assumptions, and goals of the Vizard embodiment.

System Model

Figure 1:
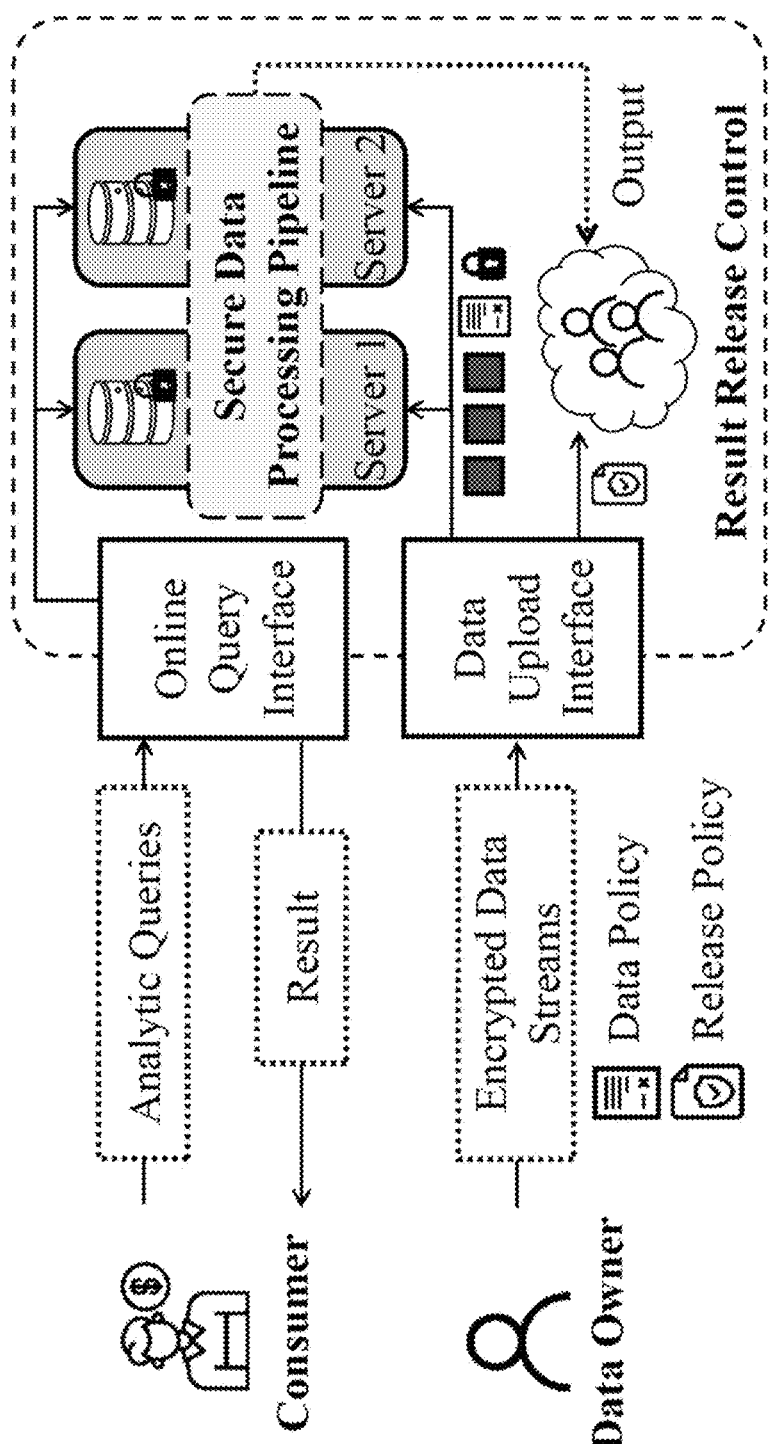
FIG. 1 is a schematic diagram of a system model of a data analytics system "Vizard" in one embodiment of the invention.

FIG. 1 illustrates the system model of the Vizard embodiment. As shown in FIG. 1, the system model of the Vizard embodiment includes the following main components:

Data Owner

Data owners are contributors who send (e.g., continuously send) encrypted data streams to the Vizard system for collective analytics. As an example, the encrypted data streams may be heart rates from a wearable device. Data owners can specify data policies arranged to regulate data usage and may define release policy that jointly regulates the result release process.

Data Consumer

Data consumers aim to learn collective knowledge by making queries to the system. As an example, a query may be related to a daily averaged heart rates in a specific region. The Vizard embodiment is arranged to generate such knowledge in a policy-controlled and private manner.

Secure Data Processing Pipeline

The secure data processing pipeline securely operates on owners' data streams and generates the requested analytic results.

Result Release Control Committee (RRC)

The result release control committee (RRC) is formed a set of stakeholders (e.g., owners, government agencies, or other third parties) to enforce data owners' release policies. The result release control committee (RRC) may be implemented using computing devices or systems.

Threat Assumptions

The secure data processing pipeline in the Vizard embodiment follows a secure two-party computation threat model and assumes that the two servers that will not collude with each other or any other party in the Vizard embodiment (e.g., servers from two different cloud providers). However, apart from the non-colluding assumptions, the two servers might try to independently infer or learn sensitive information about each data owner's data due to various interests. For honesty assumptions, rather than following a semi-honest setting and assuming totally correct executions from those two servers, the servers are considered as rational economic players whose execution correctness could be questioned. For example, the servers may be "lazy" servers that could avoid paying CPU and storage costs associated with the query process and return only partial or entirely incorrect results. For data consumers that aim to obtain useful insights over the collected data streams, the data consumers might also be interested in learning each data owner's sensitive information (like data or metadata).

Data owners are the contributors and beneficiaries (if payment rewards from the consumers are considered) in the Vizard embodiment, and thus it is assumed that the data owners will behave honestly to retain the reputation of Vizard (e.g., to enable Vizard compete with other analytic services).

For the result release control committee that is operated in a federated manner by a group of trustees, a standard Byzantine security setting is assumed, wherein at any given time, at least $t=\frac{2}{3}$ of the trustees are honest and not compromised by an attacker. Compromised trustees might deviate from the protocol and conduct arbitrary behaviors to jeopardize enforcement on release policies of the data owner.

The Vizard embodiment also assumes a secure channel (e.g., TLS) and the existence of a public-key infrastructure (PKI) for each data owner and consumer to establish secure connections with the Vizard system.

Data owners can further utilize anonymity networks to hide their IP addresses and achieve improved anonymity protections. It is also assumed that there are out-of-bound secure communication channels between any two parties in the system for exchanging data secrets when needed.

System Goals

The Vizard embodiment aims to bring effective data analytic services to data consumers while assuring full-fledged privacy and control for data owners. In particular, the Vizard embodiment aims to achieve the following system goals:

Data Confidentiality. Only the corresponding data owners can learn the contributed raw data streams. The data consumer who initiated the query can only learn about an aggregated view of those raw data streams.

Metadata Protection. Given a query request from a data consumer, the data access pattern is hidden during query executions, i.e., no party can know which data owners' data streams have been used to generate the result.

Release Policy Enforcements. Given a release policy that is jointly defined by data owners, Vizard aims to enforce that every query result is released to the data consumer if and only if it fulfills the release policy.

Data Stream Support. Vizard aims to efficiently support data streams that are continuously generated from data owners, and enable time-window-based analytic queries for data consumers.

Rich Data Policies. A variety of flexible owner-centric data policies can be supported and can work effectively and efficiently with the secure data processing pipeline.

3—Background Associated with the Vizard Embodiment

This section introduces the background techniques leveraged in the Vizard embodiment. Consider a simplified setting: there exists U data owners, and each owner i holds data di and policy string $P_i$ that indicates the corresponding owner's preferences on data usage regulations. For example, a data owner can specify in the policy string $P_i$ that only a consumer located in the EU can use his data. A consumer can make an analytic query q (together with a description string $\sigma$, e.g., his location) to enquire the system. Given q, the goal is to privately find the policy-matched owners and aggregate their data.

3.1 Distributed Point Function (DPF)

DPF is an emerging and privacy-aware solution for accomplishing the above requirement. At a high level, DPF is constructed by secret sharing a point function f (which evaluates to zero only except one single secret element) into two function shares (say $f_A$ and $f_B$), and each of them is given to one of the two servers. Each function share will not reveal the secret element anchored in f but the summation of their outputs at any point is the corresponding output value of f.

More formally, let $f_{\alpha,\beta}$: [N]→F be a point function such that $f(\alpha)=\beta$ and f(·) equals zero at any other points. A DPF includes two algorithms (Gen, Eval):

(1) DPF·Gen($\alpha,\beta$)→($k_0,k_1$): Given inputs $\alpha$ and $\beta$, generates two DPF keys $k_0$ and $k_1$ that define the two function shares of the point function $f$ (2) DPF·Eval(b, $k_b$), $\sigma\in$[N])→F: Given an input string $\sigma$, outputs value of the function share (for b∈{0, 1}) indexed by $\sigma$.

DPF guarantees that for any correctly constructed keys ($k_0$, $k_1$):

DPF·Eval($k_0$, $\sigma$)+DPF·Eval($k_1$, $\sigma$)=$\beta$ only if $\sigma=\alpha$, and the output equals zero otherwise.

Any attacker that compromises only one of the two servers can learn nothing about the secret index $\alpha$ or the value $\beta$ embedded in the DPF key shares.

The Vizard embodiment uses the DPF construction disclosed in Boyle et al., Function Secret Sharing: Improvements and Extensions (2016) as a black-box tool for effectiveness. System-level optimization techniques like parallel sub-tree traversing and one-way compression functions can be further adopted in the Vizard embodiment to boost the evaluation process.

3.2 From DPF to Policy-Controlled Private Summations

The DPF primitive can help to build a private summation service that not only protects both the data values and policies, but also hides the data access metadata (i.e., which owners have participated in a given query).

Specifically, consider for the data owner i∈{1, . . . , U} that holds data $d_i$ and policy $P_i$, the data owner i can generate a pair of DPF keys with policy string $P_i$ as the secret index ($\alpha$) and data $d_i$ as the corresponding value ($\beta$), via ($k_{0i}$, $k_{1i}$)←DPF·Gen($P_i$, $d_i$). Each data owner then gives DPF key $k_{0i}$ to server 0 and key $k_{1i}$ to server 1. This DPF ensures that the sum of outputs of the two servers is the embedded value $d_i$ only at the position indexed by $P_i$, and is zero at all other positions.

Therefore, to compute the summation of policy-matched owners' data values, for each query q, server b (b∈{0, 1}) first fetches the task description $\sigma$, and then evaluates all data owners' DPF values shared at position indexed by $\sigma$, via $$sum_b \leftarrow \sum_i^U DPF.Eval(k_{bi}, \sigma) \in F$$

Server b can then publish the value share $sum_b$ to the other server. It is easy to understand that the sum of the values published by the two servers, i.e., $sum_0+sum_1$, is the result desired for query q. Due to the inherent protections for both the value and the secret index by DPF, any attacker that can compromise one of the two servers can learn nothing about each data owner's data submission and the specific owners that have participated in a given query.

The following disclosure further illustrates how this relatively simple and efficient construction could be extended to support data streams and other enriched functionalities. For example, Section 4.1 provides a refined construction to enable more effective data stream supports and show how to enable other aggregation functions (like variance, median, max, min) with owner-side encoding techniques. For example, Section 4.3 shows ways to enable enriched data policies other than the simple exact match relation (e.g., P=$\sigma$) (e.g., by supporting AND, OR, and NOT operators). For example, Section 5 provides techniques that enable owners to jointly define release policies that control how the result should be released and to enforce them with decentralized trust.

4—Metadata-Hiding Analytics Over Data Streams in the Vizard Embodiment

To support policy-controlled private summations over data streams $$(e.g., \{d_i^0, d_i^1, \ldots, d_i^j\},$$

where j represents the epoch number) based on the previous initial design, one simple idea is to create a pair of DPF keys for every streamed data in the pipeline, and let the two servers manually select the corresponding DPF keys for query executions. For example, given a stream of DPF keys $$\left\{ k_{bi}^{0}, k_{bi}^{t1}, \ldots, k_{bi}^{tj} \right\}, b \in \{0, 1\}$$

from owner i and a query q that asks for data at epoch $t_m$, each server b can fetch all DPF keys associated with epoch $t_m$ and execute the DPF evaluation process accordingly.

While feasible, this approach may become inefficient if a query asks for data values in a longer time window (e.g., e=100 epochs), as the DPF evaluation costs grow generally linearly with the underlying time-window size (i.e., needs e·U times of DPF evaluations). Besides, data owners need to bear the continuous DPF key generation costs during every data submission process, which would also be highly undesirable.

4.1 Refined Construction for Data Streams

In relation to the above challenging issue, it is observed that while the data stream values change over time, the data policies defined by each data owner could remain unchanged for a relatively long period (after an initial setup process). Therefore, the secret index of the DPF keys generated over different epochs might remain the same. Based on this important observation, one idea is to decouple data values from the DPF keys and construct a refined storage structure for better managing each owner's data submissions (and for facilitating subsequent analytic process).

Figure 2:
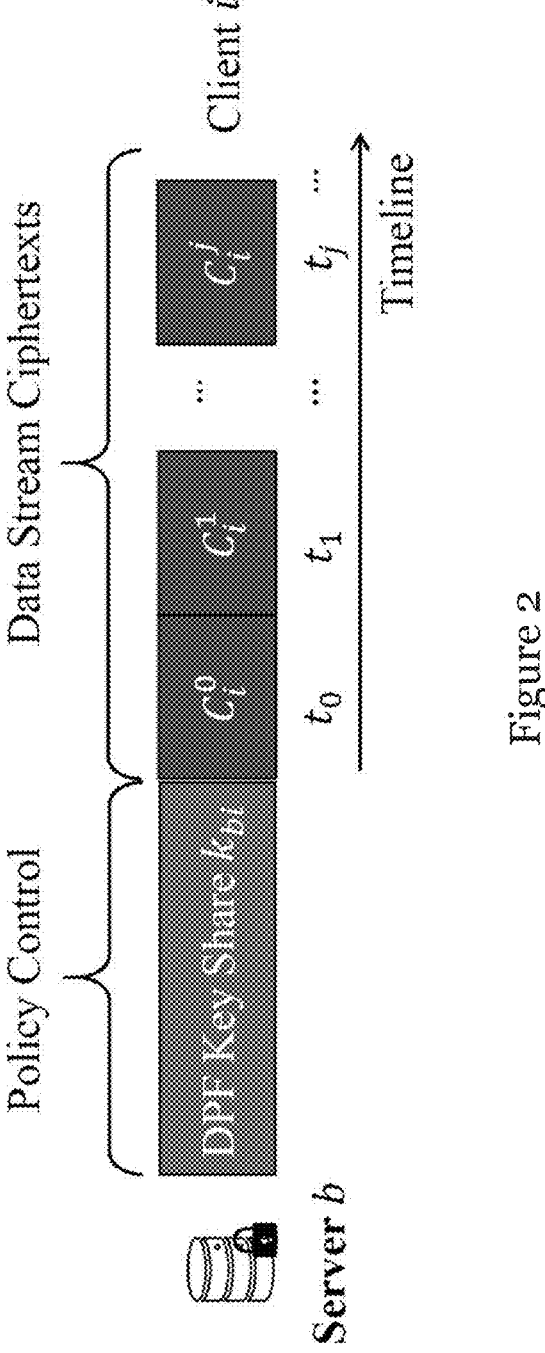
FIG. 2 is a schematic diagram of a data storage structure for data streams contributed by data owner i at each server in the system of FIG. 1 in one embodiment of the invention.

FIG. 2 shows a refined data storage structure (for data streams contributed by owner i) at each server. As shown in FIG. 2, each server stores only the latest DPF key share from each data owner, and the data streams contributed by the owner are ordered by their epoch numbers and stored directly on the server. That is, the DPF keys are used now only as a secure indicator for matching the embedded data policy with analytic queries, but not for embedding the actual data stream values. For those data stream values, a highly-scalable oblivious read-only memory (OROM) structure disclosed in Doerner et al., Scaling ORAM for Secure Computation (2017) is applied and encrypted copies of data stream values are stored on the two servers (i.e., both servers store encrypted data stream values $$\left\{ C_i^0, \ldots, C_i^j \right\}).$$

The following further describes how to construct the refined storage structure via a lightweight encryption construction, and how to further enable efficient and policy-controlled summation queries atop the refined storage structure.

4.1.1 Two-Server Homomorphic Stream Encryption

The solution is based on a symmetric homomorphic stream encryption (SHSE) scheme disclosed in Burkhalter et al., TimeCrypt: Encrypted Data Stream Processing at Scale with Cryptographic Access Control (2020), which can preserve data confidentiality while allowing direct operations over the stream ciphertexts.

Specifically, the SHSE scheme operates as follows. Consider stream data values $\{d_0, d_1, \ldots, d_j, d_{j+1}\}$ are submitted for epoch $\{t_0, t_1, \ldots, t_j, t_{j+1}\}$ respectively, and they are integers modulo M (e.g., with size $2^{64}$). Given a master key g* and a secure keyed pseudo-random function (PRF) $F_{g*}$ that maps each epoch number $t_j$ to a random key $$g_j^*$$

in the range [0, M−1], each data $d_j$ (annotated with epoch $t_j$) can then be encrypted via $$Enc(g^*, t_{j-1}, t_j, d_j) =$$
$$\left( t_j, t_{j-1}, d_j + F_{g*}(t_j) - F_{g*}(t_{j-1}) \right) = \left( t_j, t_{j-1}, d_j + g_j^* - g_{j-1}^* \bmod M \right)$$

In the rest of this disclosure, the epoch number $t_j$ and $t_{j-1}$ is deducted in the ciphertexts generated by SHSE as long as the context is clear. Note that the ciphertexts outputted from this SHSE scheme are additive via modular additions. Therefore, to compute a query $q_m$ that covers epochs $[t_j, t_l]$, the cost can be significantly reduced by requiring each server to first locally aggregate each owner's corresponding encrypted data values. Also, the aggregated ciphertext for time-window $[t_j, t_l]$ can be decrypted by computing only $k_{j-1}=F_{g*}(t_{j-1})$ and $k_l=F_{g*}(t_l)$, as the inner keys cancel out.

In relation to the use this effective SHSE scheme in a two-server setting, at first glance, it might appear that one option is to readily ask each data owner to generate a random PRF master key in the setup stage and use that key to encrypt the data stream values before sending them to the two servers. However, this idea would cause problems when aggregating (and decrypting) over ciphertext values uploaded from different owners (as the PRF keys are different). Besides, the symmetric nature of this SHSE scheme naturally prevents owners from jointly agreeing on a universal PRF master key (e.g., through a third-party provider), as any compromised party can lead to disastrous privacy incidents.

Figure 3:
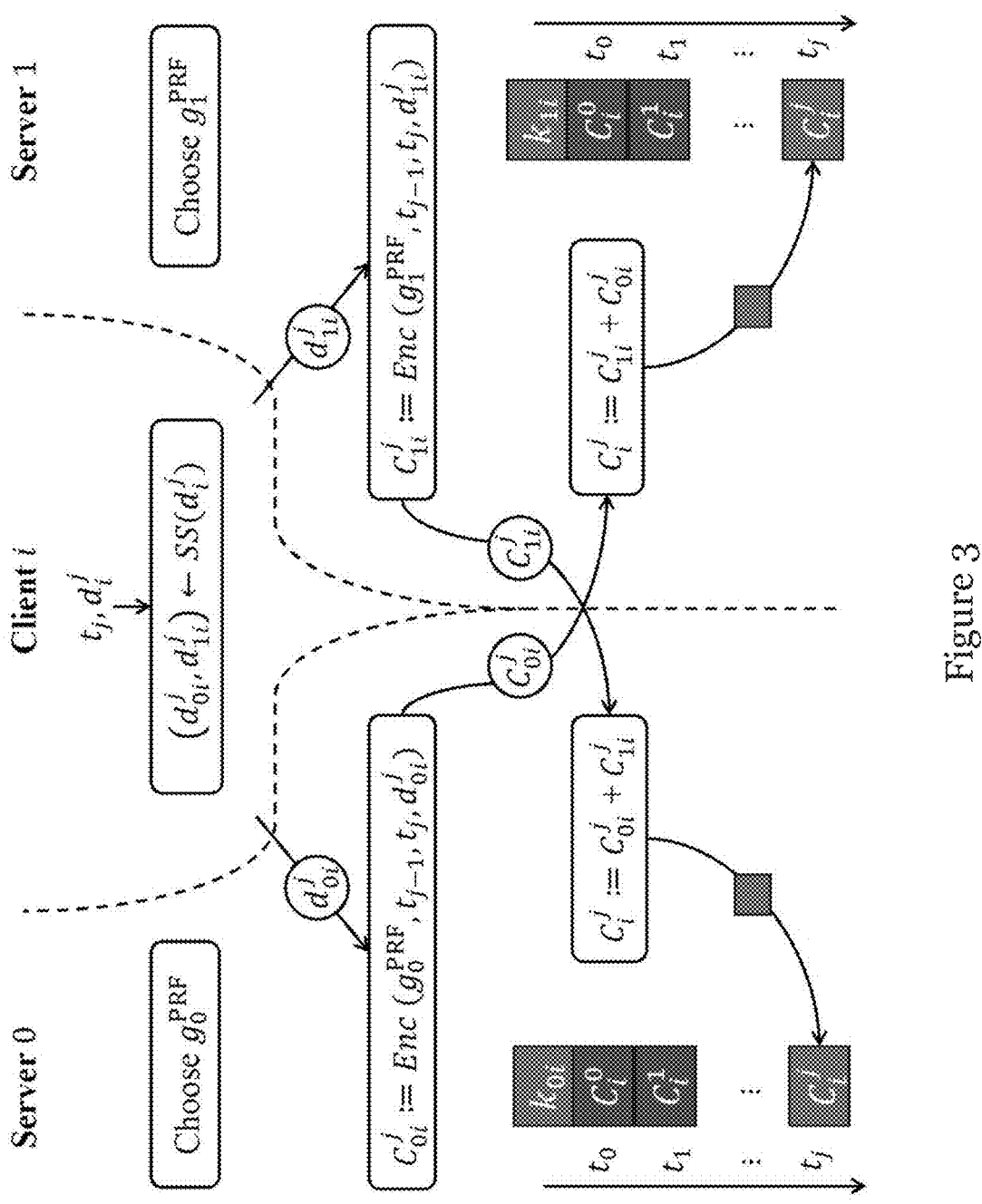
FIG. 3 is a schematic diagram of a two-server homomorphic stream encryption operation in one embodiment of the invention.

With these concerns in mind, The Vizard embodiment encrypts those values with a key jointly generated by the two servers. At a high level, inspired by the "stash-and-refresh" technique disclosed in Doerner et al., Scaling ORAM for Secure Computation (2017), the encryption process is constructed via the following two steps: split data value into additive shares for each server, and encrypt each share with a server's secret key and combine their outputs. FIG. 3 shows the two-server homomorphic stream encryption operation in one embodiment. Accordingly, each data owner is required to secretly share the corresponding data stream value to each server. More specifically, given a data value d, a data owner splits it into two shares $d_0$ and $d_1$ randomly choosing $d_0 \in M$ and computing $d_1=d-d_0 \in M$, where M is a finite field with large group size (denote the additive secret-sharing scheme as SS(·)). Data share $d_0$ is later given to server 0 and $d_1$ is given to server 1.

Next, to avoid the secure two-party computation (S2PC) overhead for PRF key generation and SHSE encryption, the SHSE process is performed independently at each server with a PRF key generated by the server itself, as shown in Protocol 1. Basically each server transmit their locally encrypted ciphertext share to the other server, and both servers can each then add those shares together. The resulting ciphertext is thus the (SHSE) encryption of $$d_i^j$$

(the original data stream value prepared by client i for epoch $t_j$) using two keys $$g_0^{PRF} \text{ and } g_1^{PRF}$$

(from server 0 and server 1, respectively), since $$C_i^j = C_{0i}^j + C_{1i}^j =$$
$$d_{0i}^j + d_{1i}^j + g_j^0 + g_j^1 - g_{j-1}^0 - g_{j-1}^1 = d_i^j + \left(g_j^0 + g_j^1\right) - \left(g_{j-1}^0 + g_{j-1}^1\right) \bmod M$$

Therefore, the two-server homomorphic stream encryption design can preserve homomorphism for its ciphertexts. To decrypt the ciphertexts aggregated for a time-window $[t_j, t_l]$, each server $b \in \{0, 1\}$ may be required to only generate $$F_{g_b^{PRF}}(t_{j-1}) \text{ and } F_{g_b^{PRF}}(t_l)$$

as the decryption keys.

---

Protocol 1: Two-server Homomorphic Stream Encryption

There are two servers and U data owners. Each data owner i (i ∈ {1, . . . , U}) holds a stream of data values {$d_i^0$, $d_i^1$, . . . , $d_i^j$, . . . }, and each server b ∈ {0, 1} holds a secret PRF key $g_b^{PRF}$. The protocol uses a finite field M with a large group size. For each epoch $t_j$, each owner i wants to encrypt his value $d_i^j$ using the keys $g_b^{PRF}$, for b ∈ {0, 1}, and replicate the result ciphertext to the two servers.
The protocol executes as the following at epoch $t_j$ ∈ I:
(1) Each data owner i ∈ {1, . . . , U} secretly splits his prepared data value $d_i^j$ into two shares via an additive secret-sharing scheme, i.e., ($d_{0i}^j$, $d_{0i}^j$) ← SS($d_i^j$). The owner sends $d_{0i}^j$ to server 0 and $d_{1i}^j$ to server 1.
(2) For every shared data value $d_{bi}^j$, each server b encrypts the value using $g_b^{PRF}$ via the SHSE scheme:
$C_{bi}^j = d_{bi}^j + F_{g_b^{PRF}}(t_j) - F_{g_b^{PRF}}(t_{j-1}) = d_{bi}^j + g_j^b + g_{j-1}^b \bmod M$
where $F_{g_b^{PRF}}$: I → [0, M − 1] I is a pseudo-random function.
(3) Each server b ∈ {0, 1} then sends the ciphertext shares ($C_{b0}^j$, $C_{b1}^j$, . . . , $C_{bU}^j$) to the other server.
(4) Finally, for each owner i, the two servers can obtain the result ciphertext $C_i^j$ by computing $C_{0i}^j$ + $C_{1i}^j$ mod M.

---

4.1.2 DPF-Based Policy Control

With two identical stream ciphertext storage at the two servers, it is then possible to privately conduct data control with owners' DPF keys so that only those matched ciphertexts will be used in a query. Recall that in addition to the list of stream ciphertexts, each server $b \in \{0, 1\}$ is also given a DPF key $k_{bi}$ that encodes the data policy $P_i$ of the owner i. Thus, only when the evaluation input $\sigma = P_i$, the sum of the two servers' DPF evaluation equals $\beta$ (which is the value embedded by owner i). To this end, the owners may be required to embed a control value "1" at the secret position that is indexed by each of their data policy, such that given a policy $P_i$ from owner i and a query described by $\sigma$, DPF·Eval($k_{0i}$, $\sigma$)+DPF·Eval($k_{1i}$, $\sigma$)=1 only if $\sigma = P_i$.

Consider a query (with description string $\sigma$) that asks for the summation over data values submitted during a time-window $[t_j, t_l]$. Let $T_{bi} \leftarrow$ DPF·Eval($k_{bi}$, $\sigma$) be the DPF evaluation output from server $b \in \{0, 1\}$ for owner i. Server b can locally compute ciphertext for time-window $[t_j, t_l]$ of owner i via $$C_i^* \leftarrow \sum_{t=j}^{l} C_i^t,$$

and compute its summation ciphertext share as $$C_b \leftarrow \sum_i^U T_{bi} \cdot C_i^t \bmod M$$

As shown below, the sum of $C_0$ and $C_1$ is the summation ciphertext desired for the query.

Next, the construction of the associated decryption key for the summation ciphertext is considered. Recall that each summation ciphertext is encrypted by keys $$g_l^b \text{ and } g_{j-1}^b (b \in \{o, 1\})$$

from the two servers. Therefore, assume that there are u owners' data values have been matched and used in the summation, each server b should compute $$u \cdot K^b \bmod M \left(\text{where } K^b = g_l^b - g_{j-1}^b \bmod M\right)$$

as its decryption key. To preserve privacy, each server b will compute $$u_b \leftarrow \sum_i^U T_{bi},$$

and then use ($u_b$, $K^b$) (for $b \in \{0, 1\}$) as secret inputs to a secure two-party computation (S2PC) process to calculate $$D \leftarrow (u_0 + u_1) \cdot (K^0 + K^1) \bmod M$$

The output will then be securely split into two additive shares (i.e., $D_0$ for server 0 and $D_1$ for server 1). After obtaining the materials above, each server b can then compute $out_b = C_b + D_b \bmod M$. By obtaining $out_b$ ($b \in \{0, 1\}$), the summation of the data values of policy-matched owners for a given query q (with description o and time-window $[t_j, t_l]$) can be learned.

Correctness Holds Since $$
\begin{aligned}
out_0 + out_1 &= \sum_i^U T_{0i} \cdot C_i^* + \sum_i^U T_{1i} \cdot C_i^* - u \cdot (K^0 + K^1) \\
&= \sum_i^U C_i^* \cdot (T_{0i} + T_{1i}) + \sum_i^U (T_{0i} + T_{1i}) \cdot (-K^0 - K^1) = \\
&\sum_i^U C_i^* - K^0 - K^1 \{P_i = \sigma\} \\
&= \sum_i^U d_i^* \{P_i = \sigma\}
\end{aligned}
$$

where $$d_i^* := \sum_{t=j}^l d_i^t$$

is the aggregated sum of the stream data values for $[t_j, t_l]$ of owner i. The generated result shares can then be delivered to the corresponding data consumer to complete the query process, and the consumer needs only to conduct a local summation process to combine the result shares and obtain the final result. In the Vizard embodiment, the generated result shares can also be securely sent to the result release control committee (RRC) for an additional release control process (further details in Section 5).

4.1.3 Proof Sketch

Given that each server that will not reveal its secret DPF and PRF keys to the other server, the refined private summation design ensures the privacy of data owners' submissions (i.e., both participation) histories for any given queries.

To start with, the security proof for policies and metadata (caused by data access leakage) directly follows from the security guarantee of DPF. Observe that each owner's policy is securely embedded in the DPF keys and a query process will access all owners' keys, which ensures that each server cannot know which owners are matched and used in the analytics. In the meantime, as the SHSE scheme encrypts each data value with a key jointly generated by the two servers (which cannot be learned by either server), it is apparent that the security proof for data privacy protection follows from the security guarantee of SHSE, which is based on the security of the underlying PRF. Moreover, each server b cannot recover each owner's (aggregated) stream values from ciphertexts $$\{C_{i \in U}^*\}$$

during the query process, as it cannot learn the decryption key $K^{1-b}$ of the other server from $D_b$ (which is randomly generated with a secure nonce known only in the S2PC process).

4.1.4 Complexity

Recall that the initial construction (which directly embeds data values in DPF keys) would require the owner to continuously generate DPF keys at every epoch, causing roughly $\lambda \cdot N$ bits of communication for each server (using a PRG with $\lambda$-bit keys and N as the length of the underlying point function). In contrast, the refined design for data streams generates only a single DPF key for each data policy and incurs $|M|$ bits of communication cost for transmitting a data share to each server. After receiving owners' data submissions, each server would need U rounds of SHSE encryption costs and $U \cdot |M|$ bits of communication to the other server for transmitting the ciphertext shares.

For executing a given query, each server can locally aggregate ciphertexts of the identified time-window (e.g., $(l-j+1)$ rounds of aggregation for $[t_j, t_l]$), U rounds of DPF evaluations and ciphertext constructions, and one round of S2PC-based multiplication process for calculating the decryption share. Such S2PC-based multiplication can be facilitated by owner-aided Beaver's triplet tricks (as disclosed in Beaver, Efficient Multiparty Protocols Using Circuit Randomization (1991)) to avoid server interactions, although it would result in an extra (amortized) $3 \log|M|$ bits sent to each server.

4.2 Aggregation Statistics Beyond Summation

The Vizard embodiment can support many other aggregate statistics beyond summation. Some examples are provided below.

As an example, consider how to compute the mean of a set of policy matched stream values. As the Vizard embodiment can naturally compute the number of matched owners by calculating a private subset histogram, i.e., by asking each server b to output $$u_b = \sum_i^U T_{bi}$$

and compute their sum, the mean can be obtained by dividing the summation result by the number of matched owners. In some examples, to support analytic functions other than mean, existing owner-side encoding techniques can be leveraged to map a data value to a vector with different statistics (e.g., variance) and execute element-wise additions to obtain the desired results. For example, by asking each owner i to encode his value as $$(d_i, d_i^2),$$

it is possible to compute the variances of a set of policy-matched data stream values by calculating $$\sum_i^U (d_i^2) - \sum_i^U (d_i)^2.$$

In some examples, for non-additive statistics (e.g., max, min, median, range), based on the disclosure in Corrigan-Gibbs et al., Prio: Private, Robust, and Scalable Computation of Aggregate Statistics (2017), each data owner i can be required to represent the value $d_i$ as a length-D vector of bits $(b_0, \ldots, b_{D-1})$, where D is the range of the data value (e.g., 0-200 km/h for traffic monitoring) and $b_j=1$ if and only if $d_i=j$. Then, the secure element-wise summation of those bits can reveal the required max, min, median, range, and other useful statistics. The disclosure in Corrigan-Gibbs et al., Prio: Private, Robust, and Scalable Computation of Aggregate Statistics (2017) contains optimizations of data values with a large range and further techniques for linear model training that can be supported in the Vizard embodiment.

4.3 Supporting Rich Data Policies

In the above design examples, owners are allowed to specify a DPF-based policy function that only matches one specific query description string, e.g., "region=EU". However, in practice, owners might want to specify a data policy function that can utilize multiple conditions and the essential AND, OR, NOT operators. For example, an owner contributing daily heart rates might want to authorize the usage to a consumer whose "type=hospital" AND "region=EU", so that the owner can authorize data usage rights to hospitals in the EU only.

To this end, the disclosure in Wang et al., Splinter: Practical Private Queries on Public Data (2017) tries to achieve a similar goal by using multiple DPF keys.

Specifically, the disclosure in Wang et al., Splinter: Practical Private Queries on Public Data (2017) has explored how to let data consumers privately define SQL-like conditions for controlling the outputs of their private queries over a plaintext public database. For example, a data consumer can privately query data values associated with a set of secret labels (e.g., age="18" and job="lawyer"). Similar to the Vizard embodiment, Wang achieves this by assuming identical storage on the two servers and constructing DPF keys whose summation evaluates to 1 only when the conditions are matched. By modifying this basic construction, Wang is able to enable two types of enriched conditions below:

AND conditions. For conditions of the form $c_1=secret_1$ AND $c_2=secret_2$ AND . . . AND $c_n=secret_n$, the secret strings are concatenated as $secret_1\|secret_2\| \ldots \|secret_n$ and used as input to the DPF key generation process. Only when all associated conditions in a query are matched, then the controlling value will be equal to 1.

OR conditions. For conditions of the form $c_1=secret_1$ OR $c_2=secret2$ OR . . . OR $c_n=secret_n$, n DPF keys are generated, with each DPF key embedding a secret string. The controlling value is calculated by $$\sum_{b \in \{0,1\}} \sum_{j=1}^{n} DPF. \, Eval\left(k_b^j\right),$$

and it is equal to 1 if only one of the conditions is matched.

The above condition designs in Wang can be adopted in the Vizard embodiment for supporting enriched data policies. However, the above condition designs in Wang falls short in performance if an owner aims to define a larger set of conditions. For example, the DPF key size for the AND operator and the evaluation costs for the OR operator will grow linearly with the number of conditions. Besides, the above condition designs in Wang cannot support the NOT operator, making it difficult for an owner to efficiently filter out some infamous data consumers or unwanted query tasks.

4.3.1 Refined Design for Data Usage Control

The Vizard embodiment aims to support the three basic operators (i.e., AND, OR, and NOT) while keeping the costs affordable even with a large set of conditions. Further details with these three basic operator are as follows:

First, consider the AND operators. To reduce the DPF key sizes when handling a large set of condition inputs, one idea is to add an extra secure function for mapping owners' policy conditions to a smaller size digest. For example, a cryptographic hash function H can be used for compressing the secret input strings (e.g., $secret_1\|secret_2\| \ldots \|secret_n$ from owner i) into a hash digest $dig_i$, and later generate the DPF keys using $dig_i$ as the input. Consider that H is a publicly known function (e.g., SHA256), each of the two servers can fetch associated description strings from a query, generate a hash digest, and finally use the digest for DPF evaluations.

Next, consider the OR operators. It might appear that the above idea associated with the AND operators can be generalized to OR operators. For example, given a set of conditions $c_1=secret_1$ OR $c_2=secret_2$ OR . . . OR $c_n=secret_n$, it is possible to generate an index digest for each input via $ind_j \leftarrow H(secret_j)$, and use $ind_j$ to label the DPF keys embedding $secret_j$. Therefore, with the labeled DPF keys from owner i, i.e., $$\left(k_{bi}^{ind_1}, \ldots, k_{bi}^{ind_n}\right)$$

for $b \in \{0, 1\}$, each server b can first hash the description string to obtain an index digest, and then find the corresponding key for subsequent DPF evaluation process. Although this design can effectively achieve O(1) DPF evaluation costs, as the two servers can reveal the secret input embedded in every DPF key via off-line hash searches, it may violate DPF security hence may not be preferred.

To remedy this threat, one idea is to always identify a fixed amount of DPF keys for the servers to evaluate, so as to hide whether there is a matched DPF key and which DPF key is matched. Specifically, given a description string $\sigma$ and n DPF keys generated by an owner, each server will be instructed to evaluate p (with p≤n) DPF keys. Those keys can consist of p dummy keys randomly selected from the n keys, or a matched key and p−1 dummy keys. To prevent the two servers from distinguishing these two settings, the design in one embodiment further follows the disclosure in Castro et al., Lightweight, Verifiable Function Secret Sharing and its Applications (2021) and constructs a set of random mapping functions for key selections.

Let RM: $\{0, 1\}^\lambda \times \{0, 1\}^N \rightarrow [m]$ be a "string-to-integer" random mapping seeded by $\theta \leftarrow \{0, 1\}^\lambda$, which can be constructed (given string $secret_j$) as $id \leftarrow H(\theta, secret_j)$ mod (m+1), where H is a cryptographic hash function salted by $\theta$ and m≥n. If different salts $\{\theta_1, \ldots, \theta_p\}$ are generated, for each input string $secret_j$, p different indexes can be obtained. However, instead of putting the DPF key generated for $secret_j$ in all those p indexes, an owner can randomly pick one and insert the key to that position (if all positions are filled, the cuckoo hash rule can be adopted to kick and reinsert an existing key). The positioning of those generated DPF keys will be finalized if all keys are inserted, and the rest positions will be filled with fake DPF keys (e.g., using 0 as their secret inputs). All the keys (together with the salts) will be given to the two servers.

For each description string input $\sigma$, each server first computes p buckets that $\sigma$ could lie, i.e., id$\leftarrow$RM($\sigma$) with all p salts. Finally, each server b will evaluate the p DPF keys identified by $$\{id_1^*, \ldots, id_p^*\}$$

using $\sigma$ and compute the controlling value $T_{bi}$ (for client i) as $$T_{bi} \leftarrow \sum_{j\in[p]} DPF.Eval\left(k_{bi}^{id_j^*}, \sigma\right) \bmod M$$

Next, consider the NOT Operators. Achieving the support for NOT operators requires the opposite of what is obtained from the DPF evaluation process, i.e., output zero if the owner's policy matches, and 1 otherwise. One idea to achieve this is to let owners create a large amount of (popular) conditions with the OR operators. While a constant evaluation cost can be achieved even with a large number of DPF keys (due to the optimized design above for OR operators), it would still incur enormous costs on the owner side for generating and transmitting those DPF keys. Thus, one idea is to design a simple transformation to let the DPF key evaluation results output the opposite value. Specifically, for a pair of DPF keys from owner i that emulates the point function $f_{P_i,1}$ (i.e., it outputs 1 only on a secret index $P_i$ and equals zero otherwise), the two servers can be allowed to evaluate i's controlling value $T_i$ as $T_i\leftarrow 1-(DPR\cdot Eval(k_{0i}, \sigma)+DPR\cdot Eval(k_{1i}, \sigma))$, so that $$T_i = \begin{cases} 0 & \text{if } P_i = \sigma \\ 1 & \text{otherwise} \end{cases}$$

which is the results required for NOT operators. To fulfill this idea, the two servers are allowed to jointly create additive shares of the value 1, e.g., via $(v_0, v_1)\leftarrow SS(1)$. In this way, each server b can compute $T_{bi}=v_b-DPF\cdot Eval(k_{bi}, \sigma) \bmod M$ for owner i. Since $v_0$ and $v_1$ are additive shares of 1, $T_{0i}+T_{1i}$ is thus the controlling value desired for NOT operators.

From the refined designs for AND, OR, and NOT operators above, it is clear that each type of operators requires a unique process for correct execution. Hence, data owners should clearly specify the underlying operator type for each generated DPF key, so that the two servers can select the proper process for query handling. Besides, instead of using each operator separately, mixed use of the operators is also supported, e.g., NOT in (secret$_1$ AND secret$_2$), by properly combining the process of AND and NOT operators.

5—Release Policy Enforcements in the Vizard Embodiment

Recall that after processing a query, each server b will obtain a result share out$_b$. This section illustrates the step that aims to enable result release policies and their enforcement during the executions. As mentioned, the Vizard embodiment relies on a committee of trustees to handle the release policies. To deliver a result, the result share from each server will be securely given to each trustee via a threshold secret sharing scheme (e.g., Shamir's scheme disclosed in Shamir, How to share a secret (1979)), and the result can be recovered if a majority of trustees (e.g., more than $\frac{2}{3}$) agree to hand out their local shares.

5.1 Committee and Policy Settings

Committee Setups. The committee for release policy enforcements, denoted as result release control committee (RRC), includes volunteering nodes from various sectors that want to join and enforce release policies. Each volunteering node will first register to the system of the Vizard embodiment. Then, a group of volunteering nodes will be selected (e.g., periodically) as trustees to form RRC. In some examples, any secure node selection methods (that can ensure byzantine security) can be utilized to form RRC. To prevent targeting attacks (where an attacker knows which nodes will be selected and compromise them in advance) that will weaken the security of RRC, in some examples, a verifiable random function (VRF) based approach is adopted for randomized node selections. After a predefined period (e.g., three months), a new batch of trustees can be selected for security.

Aggregated Release Policies. The results provided by the system of one embodiment are collective insights contributed by data owners. Therefore, it is desirable to respect the release policies specified by each data owner. However, instead of directly following each of those policies (which could be very diverse and lead to conflicting results), one idea is to narrow down the policy choices and generate an aggregated view that properly reflects all owners' policy preferences. Specifically, the Vizard embodiment carefully selects and supports the following three essential types of release policies in the current implementations:

1) Integrity-based policies that ensure result correctness and data policy enforcement
2) Privacy-based policies that address the severe privacy leakage problem caused by the results
3) Payment-based policies that bring fair incentives for owners and motivate active data contributions For each of these policies, the parameter preferences of all owners (e.g., the privacy budget on the result and the payment rates) can be aggregated and a unified release policy can be generated.

5.2 Integrity-Based Release Policies

Recall that owners' data policies are privately embedded (in the form of DPF keys) in the secure computation process between the two servers. Therefore, to enforce that owners' policies are respected during the analytic process, it is only necessary to ensure that the two servers have faithfully executed the computation protocols.

Solutions to fulfill the above goals exist. For example, the lightweight "ringer" technique disclosed in Golle et al., Uncheatable Distributed Computations (2001) can be utilized to effectively enforce result integrity in a probabilistically-secure way (under the weaker "lazy-but-honest" server setting). In the malicious setting, publicly verifiable multiparty computation (verifiable MPC) techniques can be used to check the integrity of the results given by the two servers.

5.3 Privacy-Based Release Policies

Apart from enforcing execution correctness of the two servers, endowing the aggregate statistics with differential privacy (DP) may also be highly desirable. With the enforcement of such an essential policy, owners may be more willing to contribute data as their privacy is better protected against sophisticated statistical attacks.

The Vizard embodiment follows the security framework disclosed in Roth et al., Honeycrisp: large-scale differentially private aggregation without a trusted core (2019) and Roth et al., Orchard: Differentially Private Analytics at Scale (2020). Also, the Vizard embodiment relies on the RRC to correctly generate DP noises. Specifically, in one example, each trustee will generate a DP noise locally, and a secure computation process (initiated by the trustees or the servers) will then privately sum every trustee's noise and add the noise to the result. Achieving this requirement in the byzantine setting is non-trivial, since it is necessary to ensure that the summation of all trustees' noises follows the privacy budget $(\epsilon, \delta)$ that is jointly decided by data owners. In the Vizard embodiment, this is addressed by adopting a byzantine-secure decentralized noise addition scheme (e.g., disclosed in Shi et al., Privacy-preserving aggregation of time-series data (2011)) to generate the noises, so as to enforce that every result is protected with a predefined amount of DP noises.

5.4 Payment-Based Release Policies

This policy aims to enforce that the result is revealed to the consumer only if the consumer has made the required payment. The Vizard embodiment may rely on the blockchain (e.g., Ethereum) to form a transparent payment log which all trustees in the RRC can agree upon, so that they can later locally decide whether to help the consumer recover the result or not. This ensures that the consumer can recover the result only if the consumer has paid, as the consumer cannot fraudulently claim that payment is made on the blockchain and convince the majority of trustees in the RRC. In some examples, to boost confidence on a payment, each trustee may need to wait for a few confirmation time, e.g., 6 blocks, before making decisions.

6—Example Implementation of the Vizard Embodiment

The Vizard embodiment aims to provide full-fledged protections and rich policy supports to the data owners while allowing effective data analytic services. To facilitate practical deployment of Vizard embodiment in real scenarios, the designs on the implementation sides that focus on the following are shown: data policy preferences and query formats, and integrated data stream processing pipeline that is interfaced with Apache Kafka.

6.1 Data Policy and Analytic Queries

The Vizard embodiment allows owner-centric data policies and respects them in a privacy-preserving manner. While there are many policy options that an owner can specify, one example suggests and provides a sensible and public set of options in the implementation for demonstration purposes. Specifically, in this example, each owner can specify his preferences for the following options:

1) $C_1$: Consumer. This option specifies which consumer can (or can't, by using the NOT operator) compute on his data (e.g., via the public consumer IDs)

2) $C_2$: Consumer types. This option is a relaxed version of $C_1$, which specifies the allowed type of consumers 3) $C_3$: Region. This option specifies the region requirement of the consumer 4) $C_4$: Operation. This option specifies the allowed operations (e.g., summation, variance etc.)

5) $C_5$: Purpose. This option specifies the allowed usage of his data. (Strings used to fill in each option above are standardized to facilitate the owner-consumer matching.)

The above options will be securely transformed to DPF keys together with a description that illustrates how those options will be processed on the server side.

FIG. 4 shows an example of the data stream descriptions for a heart rate sensor (left) and the secure transformation for its data policies (right). The Vizard embodiment preserves public metadata attributes (e.g., age group and country in this example) to facilitate grouping and filtering of different data streams. As an example, as shown in FIG. 4, a data owner can specify that he/she only allows hospitals in the European Union to do cardiovascular disease (CVD) studies over his/her contributed data streams. This can be done by filling in associated options (and neglecting irrelevant options), generating DPF keys according to the underlying operators (e.g., AND operator in this example), and describing their relations as "$C_2$ AND $C_3$ AND $C_5$".

To allow the two servers to correctly match query to those specified data policies, a consumer will provide a description string denoting their answers to those options $(\{C_1, \ldots, C_5\})$ in their query, and these strings will be used as inputs for DPF evaluations when processing each owner's encrypted data values. FIG. 5 shows an example of an analytic query. In addition to query information (e.g., data requirements and time-window) that help locating the demanded data streams, a description string corresponding to options $\{C_1, \ldots, C_5\}$ will also be included. For example, as shown in FIG. 5, "Hospital", "EU", and "CVD studies" will be fetched from the query shown 5 when processing the data policy above (i.e., "$C_2$ AND $C_3$ AND $C_5$"). Note that in some embodiments the description string from a consumer may be authenticated before it can be used in the Vizard embodiment.

6.2 Integration with Apache Kafka

Apache Kafka is a data stream processing platform that can preserve good load-balancing and fault-tolerant protection. However, despite its ability to handle large-scale data. One of the goals here is to integrate the Vizard embodiment with Kafka, so that the efficient processing speed can be utilized while providing sufficient privacy protection to data owners.

Figure 6:
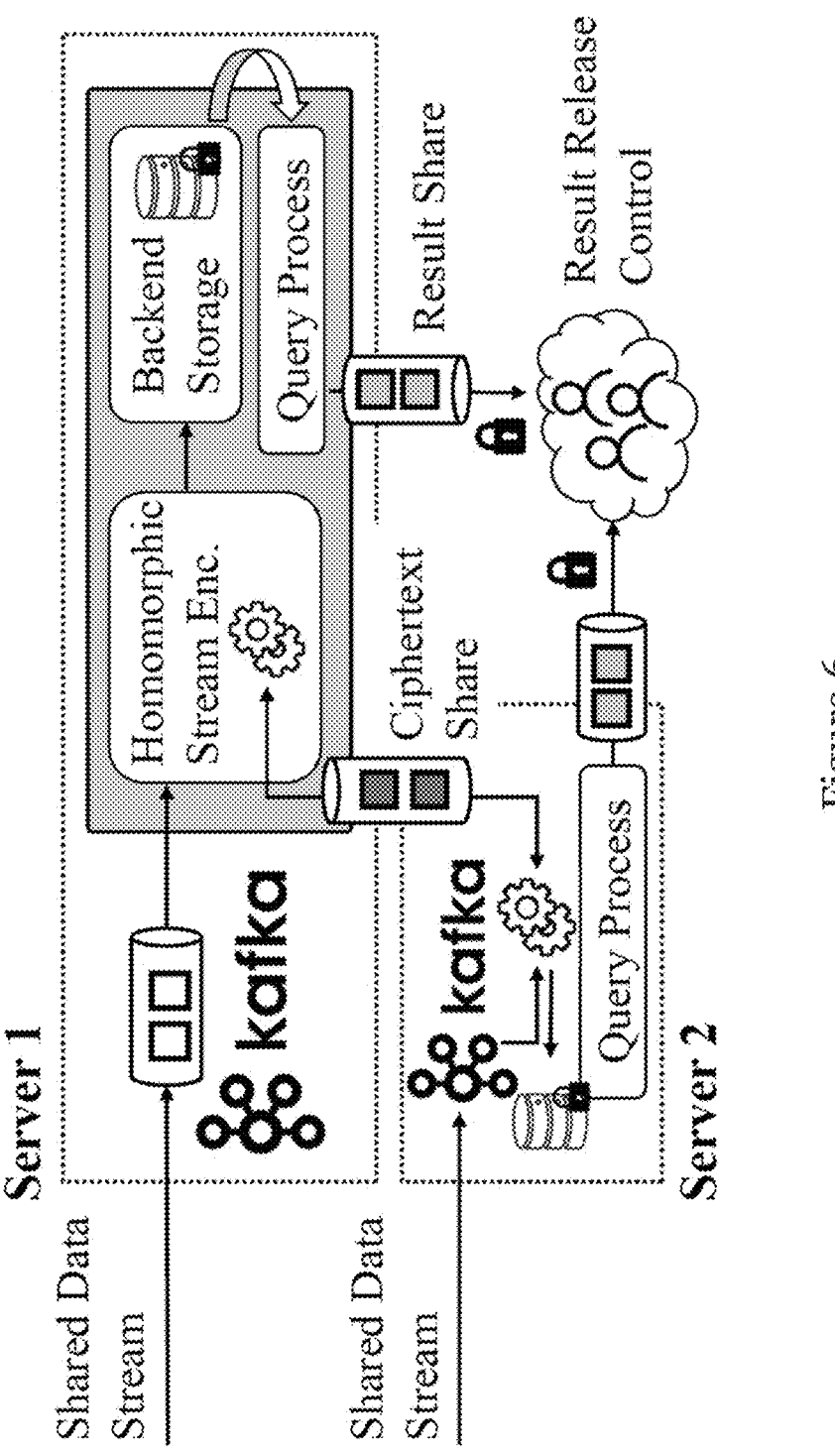
FIG. 6 is a schematic diagram of the data analytics system "Vizard" integrated with a Kafka data stream pipeline in one embodiment of the invention.

In the Vizard embodiment, an independent Kafka cluster is run on each server as its interface for handling data submission and retrieval requests. FIG. 6 shows the architectural vision of the integration of the Vizard embodiment with the Kafka data stream pipeline.

In this example, specifically, Kafka is used: as a data pipeline for buffering (shared) data streams submitted by data owners; as a ciphertext assembly pipeline to push the generated ciphertext shares to the other server (i.e., for completing the two-server stream homomorphic encryption process); and as a gateway for securely delivering result shares to each trustee in the RRC. Each party (including owners and servers) will interact with the two Kafka clusters respectively via inherent Kafka APIs, and broker replications may be enabled to boost the performance.

6.3 Implementation Details

In one example, a prototype of the Vizard embodiment is implemented on top of the Spring framework (disclosed in Spring Framework (2021): https://spring.io/, an open and flexible framework for Java development) and Apache Kafka, including roughly 3000 SLOC. Java is used in most of the implementations, but native codes in C++ are also used for DPF and PRF functions via the Java native interface. Specifically, the DPF implementation from Kales et al. (DPF implementation (2019): https://github.com/dkales/dpf-cpp) are adopted and AES is used to implement PRF protocols (and PRG inside DPF), along with CPU-based AES-NI and other intrinsic instructions for boosting speed. A standard additive sharing scheme is implemented with a finite field of group size $2^{64}$. An integrated framework (as disclosed in Spring for Apache Kafka Framework (2021): https://spring.io/projects/spring-kafka) is used for communicating with the Kafka cluster of each server.

For evaluating the result release policies, existing cryptographic libraries for Shamir's secret sharing are used, and a standard geometric distribution tool in Java is realized for noise generation. A basic version of Zeph (disclosed in Burkhalter et al., Zeph: Cryptographic Enforcement of End-to-End Data Privacy (2021)) (with one privacy controller) is implemented for comparison.

7—Evaluations of the Vizard Embodiment

The effectiveness of the Vizard embodiment is evaluated focusing on its ability to handle large-scale data streams. The experimental evaluation includes three parts, which test the performance on data submission, data processing, and result release stages respectively.

Experiment Setup. The benchmarks for owners, servers, RRC trustees, and consumers are run on Amazon EC2 instances (m5. xlarge, 4 vCPU, 16 GiB, Ubuntu Server 20.04 LTS). Additionally, Amazon MSK is leveraged to enable a Kafka cluster for each server on an instance with the same configuration above, and an additional Amazon RDS server (m5. xlarge with 100 GB gp2 SSD) is further employed as each server's MySQL database instance. Servers are deployed on two EC2 instances spread over two availability zones in the Asia Pacific (Hong Kong) region, and RRC trustees are placed in different availability zones in this region also to simulate federations. This configuration helps to benchmark in a controlled environment where network fluctuations are less likely. Based on the evaluations, the bandwidth of each instance in this environment is 5 Gbps and the round trip time (RTT) between any two instances is around 0.58 ms. The Java micro-benchmark Harness tool is employed for performance evaluations.

7.1 Data Owner

Computation. The computation costs for a data owner to create data stream submissions, which include the construction of DPF keys and data shares, are determined. FIG. 7 shows the owner cost for generating DPF keys and shares for different stream encodings: sum, average, variance, and histogram (with ten buckets) in one example. As shown in FIG. 7, both procedures above are efficient, which need only around 3.6 μs to generate a pair of DPF keys for a data policy and around 3.7 μs for additive share generations. The speed for different encodings (i.e., average, variance, and histogram) are also tested and it is found that the throughput ranges from 25 k to 130 k submission per second, depending on the underlying encoding.

Bandwidth. The submission size for each server will be determined by the number of DPF keys and the number of data elements in the encoding. However, overall, it only requires around 26.76 KB to simultaneously transmit 100 shared data elements and 10 DPF keys (each takes 1020 Bytes), which appears to be affordable for both PC users and mobile phone users.

7.2 Data Processing Pipeline

Throughput for Handing Submissions. Recall that after generating the submission shares, data owners will stream each share to one server for processing via its Kafka cluster. The Kafka cluster is used as a buffer for coping with large-scale data stream submissions. At its core, it includes two main APIs: a producer API that imports data stream to the cluster and a consumer API that exports the requested streams from the cluster. FIG. 8 shows the Kafka throughput for data stream submissions. From FIG. 8, it can be seen that the implementation nicely integrates with Kafka, and can leverage its scaling features as expected.

Table 1 shows that increasing both the partition and broker numbers in Kafka can help further boost the performance when the submission scale is large enough (e.g., 1 million submission records per second).

TABLE 1

Throughput (records/second) vs. Kafka stream partitions and broker replications (partition = 1 is the comparison baseline). R represents the replication factor.

| Partition | Submission = 1k | | Submission = 1M | |
|---|---|---|---|---|
| Numbers | R = 1 | R = 3 | R = 1 | R = 3 |
| 1 | 2.85k | 2.78k | 301.93k | 221.72k |
| 3 | 0.99× | 0.98× | 1.42× | 1.16× |
| 5 | 1.02× | 0.99× | 1.40× | 1.51× |
| 10 | 1.06× | 1.02× | 1.41× | 1.84× |

Two-server Homomorphic Encryption. Each server will consume data streams from its Kafka cluster and conduct the encryption process for generating all owners' stream ciphertexts. The costs for computation (i.e., local encryption and ciphertext share addition) and communication between the two servers are shown in Table 2. From Table 2, it can be observed that the main bottlenecks are time costs for encryption and ciphertext share transmissions (which are conducted through monitoring the other server's Kafka cluster). Nonetheless, overall, it takes less than a second for the two servers to jointly encrypt 100 k shares. The generated stream ciphertexts could be stored in an SQL-enabled database to facilitate subsequent queries, which takes an additional and linearly growing time costs for database insertions (e.g., 12.3 s for inserting 10 k records).

TABLE 2

Micro-benchmark on each server for conducting two-server homomorphic encryption.

| # Submissions | Enc. | Comm. | Add. | Database (opt.) |
|---|---|---|---|---|
| 100 | 0.5 ms | 68 ms | 0.1 ms | 0.3 s |
| 1k | 6.3 ms | 74 ms | 0.1 ms | 1.9 s |
| 10k | 54.3 ms | 118 ms | 1.1 ms | 12.3 s |
| 100k | 555.1 ms | 321 ms | 11.6 ms | 120.5 s |

Figure 10:
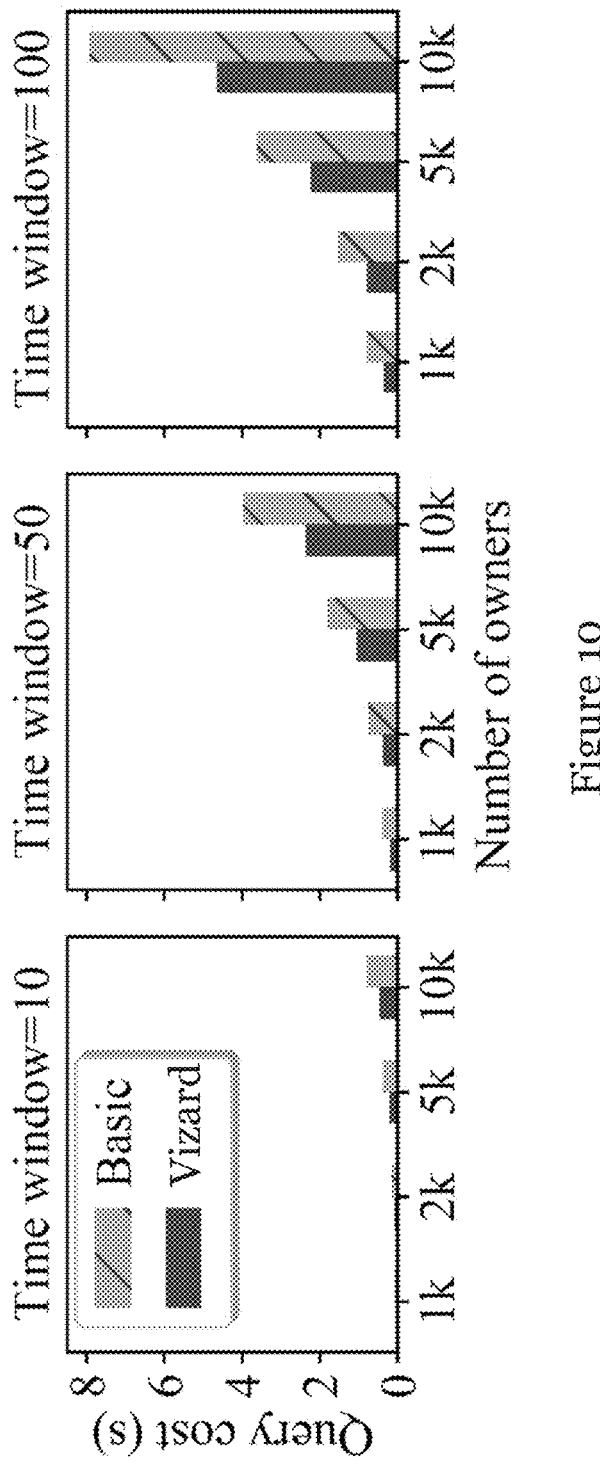
FIG. 10 are graphs showing the time cost for conducting secure queries with respect to the number of data owners (1 k, 2 k, 5 k, 10 k) for different time-window lengths (10, 50, 100) in one example.

Query Cost. Once an analytic query process is triggered, each server will locally aggregate all specified ciphertexts (i.e., based on the time-window), securely evaluate all owners' DPF keys, and jointly decrypt and generate a share of the result. FIG. 10 shows the time cost for conducting secure queries with respect to the number of owners and the time-window length. Specifically, FIG. 10 shows the evaluation result and its comparison with the basic solution illustrated in Section 3 (which readily embeds data in the DPF keys). It turns out that the query cost scales with the owner numbers and the time-window length (for retrieving more ciphertexts from the database). Nonetheless, overall, it takes only around 4.6 s to query over 10 k owners with a time-window of 100 ciphertexts, which is just 58.8% of the basic construction. It can be seen that such performance gain will moderately decrease when the number of owners grows (as additional processing steps other than DPF key evaluations are required). But in the evaluations it can still achieve 1.4× time cost savings (71.4% of the basic construction) with 100 k owners (and a time window of 10 ciphertexts), and the gain will grow noticeably when a larger window of ciphertexts is queried.

Figure 11:
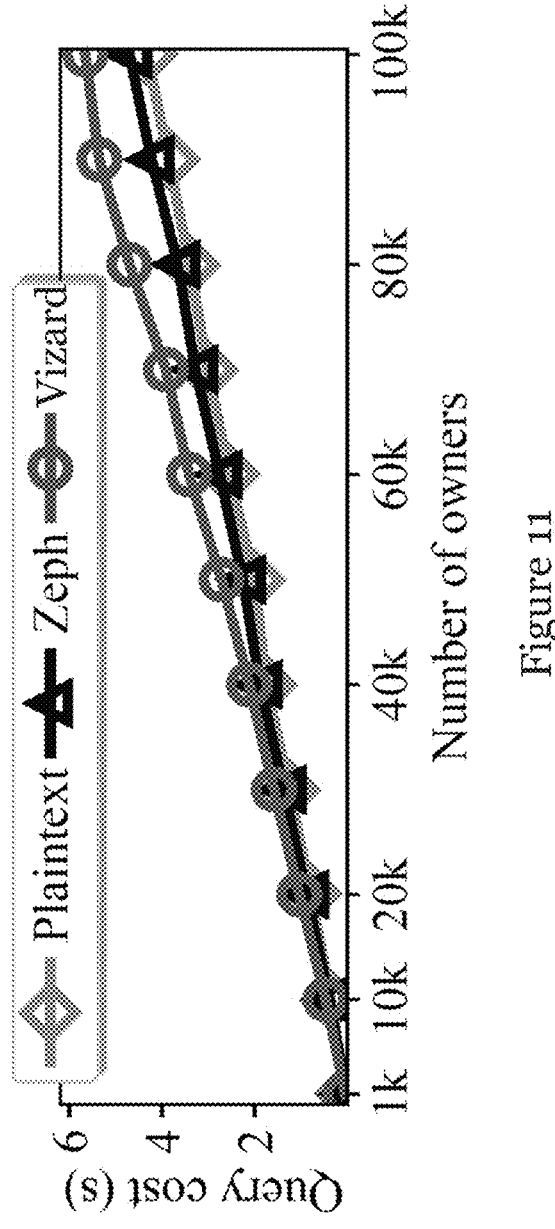
FIG. 11 is a graph showing query cost comparison of the data analytics system "Vizard", plaintext queries "Plaintext" and an existing system "Zeph" with a time-window of ciphertexts in one example.

The Vizard embodiment's query process is also compared with that in Zeph, an existing data analytic system that enforces privacy control but does not provide metadata (or policy) protection. FIG. 11 shows the Query cost comparison result. As shown in FIG. 11, the Vizard embodiment only incurs an additional 1.12× to 1.26× latency overhead compared to Zeph, which appears to be an affordable security trade-off for the query process.

Finally, the DPF key evaluation process is investigated and the cost for supporting enriched policies (i.e., with AND, NOT, and OR operators) is evaluated. It is found that the execution of AND and NOT operators adds a very slight cost (<0.1 ms) to the evaluation process. FIG. 9 compares the optimized approach for the OR operator with the standard approach that linearly evaluates DPF keys, and the results confirm the performance gain of the proposed approach (e.g., 54% cost reduction for 50 OR conditions).

7.3 Result Release Control

The release control cost for delivering one result with an RRC consisting of 10 to 30 trustees is evaluated. For simplicity, the initialization time cost for RRC formations is omitted and the focus is only on the added cost for each trustee and the two servers due to the proposed release controls. Beginning with the result share splitting process on each server. In the proposed evaluation, it requires less than 0.6 ms to compute shares for an RRC of 30 trustees and less than 1 ms to deliver each share to one trustee via its Kafka cluster, which is efficient to ensure a smooth delivery process.

Cost for Release Policy Executions. The performance of the release policies is the Vizard embodiment is evaluated with "lazy-but-honest" servers. The integrity-based policy follows the widely adopted "ringers" technique (e.g., disclosed in Golle et al., Uncheatable Distributed Computations (2001)) to check servers' integrity in a probabilistically-secure way. That is, challenge queries and their commitment tokens (which are prepared in advance by owners) are inserted in a batch of new queries and the answer (e.g., the challenge queries' ids) is secretly shared to each trustee in the RRC. This technique can ease the cost on the server sides for integrity proof generations, i.e., finding which queries in the given batch are the challenge queries. In the proposed evaluation, it only adds around 2.25 ms per query for the two servers. Once the servers output their proofs, answer recovery is required for each trustee to validate the proof.

Although the recovery cost grows with the number of trustees, the overall cost remains moderate (e.g., less than 0.25 s for 30 trustees).

The proposed decentralized DP-based release policy is output perturbation based, which asks each trustee to sample byzantine-secure noise locally. The noise addition cost is evaluated with a secure computation process initiated by the two servers, i.e., each sampled noise will be treated as a data submission for the two servers and added during the query process. From Table 3, it can be seen that both the noise generation and addition process are at the microsecond scale, which are very efficient. Last but not least, for the payment based policy that asks each trustee to check against a consumer's payment proof on a public ledger like Ethereum, the proof checking cost is evaluated using a popular infrastructure named Block-Cypher. The result shows that each trustee requires around 1.5 s to complete the check, which appears to be acceptable given that a consumer can make a batch payment for a large number of queries.

TABLE 3

| Computation Cost for Release Control vs. RRC Size. | | | | | |
|---|---|---|---|---|---|
| RRC | Integrity (batch = 20) | | Privacy | | Payment |
| Size | Proof Gen. | Check | Noise Gen. | Add. | Check |
| 10 | 45 ms | 1.83 ms | 3.9 μs | 0.1 μs | ~1.5 s |
| 20 | 45 ms | 30.62 ms | 3.9 μs | 0.1 μs | ~1.5 s |
| 30 | 45 ms | 242.06 ms | 3.9 μs | 1 μs | ~1.5 s |

In this example, the cost for result delivery from RRC to a consumer is omitted, as it largely depends on the location and network condition of the consumer and trustees. After collecting all required shares from the RRC trustees, the proposed release process would bring an additional 1.7 to 272 ms computation cost for the consumer to recover the result (or DP-protected result), depending on the RRC size.

8—Example Extensions of the Vizard Embodiment

This section provides some possible extension or modifications of the Vizard embodiment.

On possible extension or modification relates to addressing malicious owners. In one example, it is possible to provide protections against malicious owners that might inject carefully crafted inputs (e.g., out-of-range data inputs) to the Vizard embodiment in order to influence the analytic outputs more than they should. This problem has been studied in the multi-server settings since the seminal Prio system (disclosed in Corrigan-Gibbs et al., Prio: Private, Robust, and Scalable Computation of Aggregate Statistics (2017)) and it is covered in existing efforts that aim to provide verifiability to the generated DPF keys (in the semi-honest or the fully malicious server setting). The Vizard embodiment can adopt those techniques to strengthen defense against malicious clients, ensuring that: the data shares of the data owners are within a valid range, and the DPF keys of the data owners indeed evaluate to a correct point function that has at most one non-zero component.

On possible extension or modification relates to parallel accesses. One performance setback in the Vizard embodiment relates to the linear DPF key evaluation costs: i.e., each server needs to go through all clients' keys to obtain the correct results. While this is a security trade-off for providing metadata protections, the performance can be boost by letting each server evaluate every owner's DPF keys in parallel. Also, the two servers can create multiple instances, so that each pair of instances can handle a query request in parallel and boost the batch query performance.

9—Example Data Processing System

Figure 12:
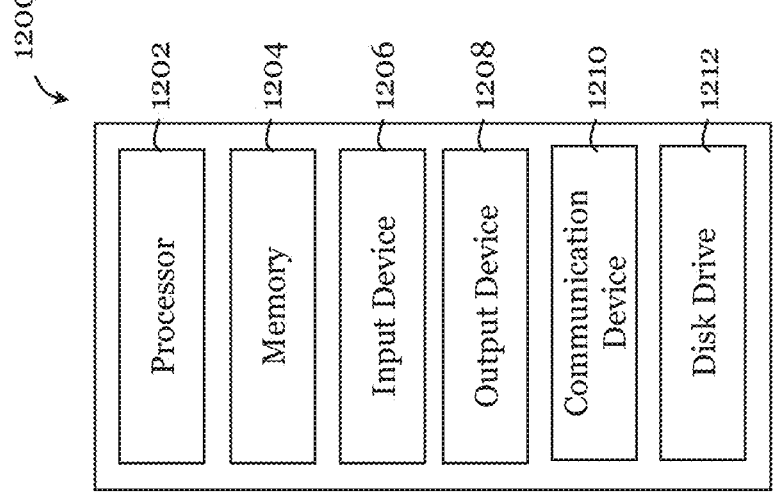
FIG. 12 is a block diagram illustrating a data processing system in some embodiments of the invention.

FIG. 12 shows an example data processing system 1200 that can be used as a server or another type of data processing system in one embodiment of the invention. The data processing system 1200 can be used as at least part of a data analytics system, e.g., at least part of a server system of a data analytics system. The data processing system 1200 can be used to implement or facilitate implementation of, partly or entirely, one or more method embodiments and/or one or more operations embodiments of the invention. For example, the data processing system 1200 can be used to implement or facilitate implementation of the method 1300, the method 1400, the Vizard embodiment, etc.

The information handling system 1200 generally comprises suitable components necessary to receive, store, and execute appropriate computer instructions, commands, and/or codes. The main components of the information handling system 1200 are a processor 1202 and a memory (storage) 1204. The processor 1202 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1204 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1204. Computer instructions for executing or facilitating executing the method embodiments of the invention may be stored in the memory 1204. The processor 1202 and memory (storage) 1204 may be integrated or separated (and operably connected). Optionally, the information handling system 1200 further includes one or more input devices 1206. Example of such input device 1206 include: keyboard, mouse, stylus, image scanner, microphone, tactile/touch input device (e.g., touch sensitive screen), image/video input device (e.g., camera), etc. Optionally, the information handling system 1200 further includes one or more output devices 1208. Example of such output device 1208 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1200 may further include one or more disk drives 1212 which may include one or more of: solid state drive, hard disk drive, optical drive, flash drive, magnetic tape drive, etc. A suitable operating system may be installed in the information handling system 1200, e.g., on the disk drive 1212 or in the memory 1204. The memory 1204 and the disk drive 1212 may be operated by the processor 1202. Optionally, the information handling system 1200 also includes a communication device 1210 for establishing one or more communication links (not shown) with one or more other computing devices, such as servers, personal computers, terminals, tablets, phones, watches, IoT devices, or other wireless computing devices. The communication device

1210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1202, the memory 1204 (optionally the input device(s) 1206, the output device(s) 1208, the communication device(s) 1210 and the disk drive(s) 1212, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 1200 shown in FIG. 12 is merely an example and that the information handling system 1200 can in other embodiments have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or data processing hardware capable of implementing the function described.

10—Remarks

While owner-centric control is a widely adopted method for easing owners' concerns over data abuses and motivating them to share their data out to gain collective knowledge, many existing control enforcement techniques have been proposed neglect privacy threats due to the metadata leakage therein. In practice, a sophisticated attacker can infer sensitive information based on either owners' data control policies and/or their analytic task participation histories (e.g., participating in a mental illness or cancer study can reveal their health conditions). To address this problem, some embodiments of the invention provide a metadata-hiding analytic system named "Vizard" that enables privacy-hardened and enforceable control for owners. Vizard is built with a tailored suite of lightweight cryptographic tools and designs that help to efficiently handle analytic queries over encrypted data streams coming in real-time (like heart rates). Extension designs can be applied to further enable advanced owner-centric controls (with AND, OR, NOT operators) and provide owners with release control to additionally regulate how the result should be protected before deliveries. A prototype of Vizard interfaced with Apache Kafka is developed. The evaluation results demonstrate the practicality of Vizard for large-scale and metadata-hiding analytics over data streams.

The Vizard embodiment provides, among other things, a metadata-hiding data analytic system that allows data owners to share their data for collective knowledge in a streamlined, privacy-preserving, and/or fully-controlled manner. It is envisaged that this data analytic system can address existing data silos problem and facilitate large-scale data stream analytic services.

More generally, some embodiments provide an efficient and metadata-hiding data analytic system that can provide full-fledged privacy preservation and enforceable control to data owners. Some embodiments provide a system that makes customized use of a suite of lightweight cryptographic techniques and proposes n designs to further accommodate the needs of practical data stream processing systems.

Some embodiments consider a classic setting where each owner communicates with two non-colluding servers to outsource their data submissions and execute the analytic tasks. Some embodiments protect the confidentiality of owners' data and policies as long as an attacker can compromise at most one server. To further fulfill end-to-end controls, the system in some embodiments enables release policies for the query results given by the two servers and enforces them through a decentralized byzantine-secure committee. In some embodiments, data consumers will contact the committee for result retrievals and obtain the policy-enforced results.

The system in some embodiments solves private subset histogram problem with the help of a cryptographic tool named distributed point function (DPF), which is basically a secret-shared and compressed point function that has only one non-zero output. To reduce the computational costs emerged in constructing DPF keys, the system in some embodiments decouples owners' data from DPF keys. Because the data values are stored outside of the DPF keys, some embodiments can allow the two servers to self-aggregate the requested data values in advance (e.g., for a time-window covering several epochs), so that only a single data value will be used as input for each owner in subsequent analytics. In some embodiments, the system stores a single pair of DPF keys for each owner (as long as an owner's data policy remains unchanged) and only uses them to secretly embed controlling values of 0 or 1 when going through all owners' data values.

The system in some embodiments supports rich data policy. The system in some embodiments provides data owners the ability to combine multiple conditions with various operators like AND, OR, and NOT in their data policies. In some embodiments, the policy constructions of each owner can be modified via the use of hash digests and cuckoo hashing, so that the controlling value (i.e., 1 or 0) can properly reflect the policy logic defined by the underlying operators. In some embodiments, the optimized designs can ensure that the two servers can just evaluate a constant amount of DPF keys even when the number of policy conditions scales. For NOT operator, the system in some embodiments handles it by securely inverting the controlling values with secret shares of the value 1.

The system in some embodiments provides data owners with controls on how their data should be released. The system in some embodiments relies on a decentralized committee with honest majority to jointly enforce the data release policy without centralized trust. Each trustee in the committee will execute policy-specific and byzantine-secure operations to independently conduct result release controls, and data consumers will obtain the results only if the majority of trustees approve their requests.

Embodiments of the invention can provide various functions. For example, some embodiments of the invention provide application interface(s) for data owner to provide their confidential data or data stream securely and privately, and for data consumers to query aggregated views for certain data for analytical proposes. For example, some embodiments of the invention protect metadata of data during the query process. For example, some embodiments of the invention provide rich-data-policy supports with AND, OR, and NOT operators. For example, some embodiments of the invention provide decentralized result release control and lightweight constructions for integrity, privacy, and payment related release policies.

The main application of some embodiments of the invention is a new metadata-hiding and policy-controlled analytic system in the two-server setting. Some embodiments of the invention has one or more of the following properties: data confidentiality; metadata protection; release policy enforcements; data stream support; and rich data policies.

Some embodiments of the invention aim to develop a secure and incentivized data sharing platform, so that data owners are encouraged to share their data out without worrying about data security and instead can reap the benefits generated from their data. Some potential applications for some embodiments of the invention include: 1) offer a secure and verifiable platform for data owners to authorize their data to be utilized by authorized applications only, without using a trusted central authority; and 2) offer rich analytic services to data consumers to satisfy their customized need on data analysis.

It will be appreciated by a person skilled in the art that variations and/or modifications may be made to the described and/or illustrated embodiments of the invention to provide other embodiments of the invention. The described and/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For the illustrated method or operations, the method/operation steps can be performed in any order (e.g., performed sequentially, at least partly simultaneously, etc.), as logically appropriate and applicable.

The invention claimed is:

1. A method for operating a data analytics system, comprising:

storing, at a first server system of the data analytics system, a first key associated with a data provider; and storing, at a second server system of the data analytics system, a second key associated with the data provider;

wherein the first key and the second key are complementary keys generated using a secret sharing based cryptographic algorithm based on a policy arranged to control usage of data provided by the data provider; and wherein the first key and the second key are arranged to facilitate performing of a data analytics operation at the data analytics system.

2. The method of claim 1, wherein the secret sharing based cryptographic algorithm comprises a distributed point function based cryptographic algorithm.

3. The method of claim 1, wherein the data analytics operation is based on the secret sharing based cryptographic algorithm.

4. The method of claim 3, wherein the data analytics operation is arranged to:

analyze data provided by data providers including the data provider based on a data analytics query; and determine a data output of data provided by one or more data providers that match the data analytics query.

5. The method of claim 1, wherein the policy comprises a plurality of conditions; and wherein (i) at least two of the plurality of conditions being associated with an AND operator;

(ii) at least two of the plurality of conditions being associated with an OR operator; and/or (iii) at least two of the plurality of conditions being associated with a NOT operator.

6. The method of claim 5, wherein the plurality of conditions includes at least two of the following conditions:

a condition associated with data consumer or type of data consumer that can or cannot access the data provided by the data provider;

a condition associated with a location requirement for data consumer or type of data consumer that can or cannot access the data provided by the data provider;

a condition associated with usage control of the data provided by the data provider; and a condition associated with operation that can or cannot be performed using the data provided by the data provider.

7. The method of claim 1, further comprising:

receiving or obtaining, at the first server system, a first share of the data provided by the data provider;

receiving or obtaining, at the second server system, a second share of the data provided by the data provider;

encrypting, at the first server system, the first share of the data based on a secret key of the first server system using a symmetric homomorphic stream encryption (SHSE) based method, to obtain an encrypted first share of the data;

encrypting, at the second server system, the second share of the data based on a secret key of the second server system using the symmetric homomorphic stream encryption (SHSE) based method, to obtain an encrypted second share of the data, the secret key of the second server system being different from the secret key of the first server system; and determining, at one or both of the first server system and the second server system, an encrypted data based on the encrypted first share of the data and the encrypted second share of the data.

8. The method of claim 7, wherein determining the encrypted data comprises:

determining, at the first server system, the encrypted data based on the encrypted first share of the data and the encrypted second share of the data; and determining, at the second server system, the encrypted data based on the encrypted first share of the data and the encrypted second share of the data.

9. The method of claim 7, further comprising:

storing the encrypted data at each of the first server system and the second server system.

10. The method of claim 7, wherein the encrypted first share of the data is in the form of a ciphertext share;

wherein the encrypted second share of the data is in the form of a ciphertext share; and wherein the encrypted data is in the form of a ciphertext formed based on the ciphertext share of the encrypted first share of the data and the ciphertext share of the encrypted second share of the data.

11. The method of claim 7, wherein the data consists only of the first share of the data and the second share of the data; and wherein the first share of the data and the second share of the data are split from the data.

12. The method of claim 11, wherein the first share of the data and the second share of the data are split randomly from the data.

13. The method of claim 11, wherein the first share of the data and the second share of the data are split from the data based on an additive secret sharing based method.

14. The method of claim 7, wherein the secret key of the first server system is a pseudo-random function key generated based on a pseudo-random function; and wherein the secret key of the second server system is a pseudo-random function key generated based on a pseudo-random function.

15. The method of claim 1, wherein the data includes a data value.

16. The method of claim 15, wherein the data includes the data value and one or more values arithmetically associated with the data value.

17. The method of claim 1, wherein the data includes a vector of bits.

18. The method of claim 7, wherein the data provided by the data provider is part of a data stream that is provided by the data provider and includes, at least, a first data corresponding to a first epoch and a second data corresponding to a second epoch, the first data being the data; and wherein the method further comprises:

receiving or obtaining, at the first server system, a first share of the second data provided by the data provider;

receiving or obtaining, at the second server system, a second share of the second data provided by the data provider;

encrypting, at the first server system, the first share of the second data based on the secret key of the first server system using the symmetric homomorphic stream encryption (SHSE) based method, to obtain an encrypted first share of the second data;

encrypting, at the second server system, the second share of the second data based on the secret key of the second server system using the symmetric homomorphic stream encryption (SHSE) based method, to obtain an encrypted second share of the second data; and determining, at one or both of the first server system and the second server system, an encrypted second data based on the encrypted first share of the second data and the encrypted second share of the second data.

19. The method of claim 18, wherein determining the encrypted second data comprises:

determining, at the first server system, the encrypted second data based on the encrypted first share of the second data and the encrypted second share of the second data; and determining, at the second server system, the encrypted second data based on the encrypted first share of the second data and the encrypted second share of the second data.

20. The method of claim 18, further comprising:

storing the encrypted second data at each of the first server system and the second server system.

21. The method of claim 18, wherein the encrypted first share of the second data is in the form of a ciphertext share;

wherein the encrypted second share of the second data is in the form of a ciphertext share; and wherein the encrypted second data is in the form of a ciphertext formed based on the ciphertext share of the encrypted first share of the second data and the ciphertext share of the encrypted second share of the second data.

22. The method of claim 1, wherein the first server system is arranged in a first cloud network; and wherein the second server system is arranged in a second cloud network separate from the first cloud network.

23. The method of claim 1, wherein the first key and the second key are complementary keys generated using the secret sharing based cryptographic algorithm based on: the policy arranged to control usage of data provided by the data provider.

24. A data analytics system comprising: a first server system and a second server system, wherein each of the first and second server system comprises a processor and a memory; wherein the first server system and the second server system are arranged to perform a method of claim 1 comprising the steps of: storing, at the first server system of the data analytics system, a first key associated with a data provider; and storing, at the second server system of the data analytics system, a second key associated with the data provider; wherein the first key and the second key are complementary keys generated using a secret sharing based cryptographic algorithm based on a policy arranged to control usage of data provided by the data provider; and wherein the first key and the second key are arranged to facilitate performing of a data analytics operation at the data analytics system.

* * * * *